(12) United States Patent
Werner et al.

(10) Patent No.: US 12,404,053 B2
(45) Date of Patent: Sep. 2, 2025

(54) MODULAR AIRCRAFT

(71) Applicant: INNOTEC LIGHTWEIGHT ENGINEERING & POLYMER TECHNOLOGY GMBH, Goslar (DE)

(72) Inventors: Jens Werner, Wilsdruff STT Kesselsdorf (DE); Phil Pezus, Wilsdruff STT Kesselsdorf (DE); Matthias Bieler, Wilsdruff STT Kesselsdorf (DE); Florian Franke, Wilsdruff STT Kesselsdorf (DE)

(73) Assignee: INNOTEC LIGHTWEIGHT ENGINEERING & POLYMER TECHNOLOGY GMBH, Goslar (DE)

( * ) Notice: Subject to any disclaimer, the term of this patent is extended or adjusted under 35 U.S.C. 154(b) by 842 days.

(21) Appl. No.: 16/772,213

(22) PCT Filed: Dec. 13, 2018

(86) PCT No.: PCT/DE2018/101017
§ 371 (c)(1),
(2) Date: Jun. 12, 2020

(87) PCT Pub. No.: WO2019/114884
PCT Pub. Date: Jun. 20, 2019

(65) Prior Publication Data
US 2021/0070436 A1 Mar. 11, 2021

(30) Foreign Application Priority Data

Dec. 15, 2017 (DE) .......................... 102017130251.4
Dec. 15, 2017 (DE) .......................... 102017130252.2
(Continued)

(51) Int. Cl.
*B64U 20/40* (2023.01)
*B60L 53/00* (2019.01)
(Continued)

(52) U.S. Cl.
CPC ............... *B64F 1/30* (2013.01); *B60L 53/00* (2019.02); *B60L 53/16* (2019.02); *B60L 53/31* (2019.02);
(Continued)

(58) Field of Classification Search
CPC ... B64C 27/08; B64C 27/20; B64C 2201/027; B64C 2201/042
See application file for complete search history.

(56) References Cited

U.S. PATENT DOCUMENTS 3,002,712 A 10/1961 Beckwith
3,135,481 A 6/1964 Sudrow
(Continued)

FOREIGN PATENT DOCUMENTS

CN 205131632 U 4/2016
DE 102007023622 A1 1/2009
(Continued)

OTHER PUBLICATIONS

U.S. Appl. No. 16/772,217, filed Jun. 12, 2020.
(Continued)

*Primary Examiner* — Joshua J Michener
*Assistant Examiner* — Colin N Zohoori
(74) *Attorney, Agent, or Firm* — Abel Schillinger, LLP

(57) ABSTRACT

A modular vertical take-off and landing aircraft for transporting persons and/or loads, comprising a flight module with multiple drive units arranged on a supporting framework structure, each drive unit having an electric motor and a propeller operatively connected to the electric motor, a transport module having a conveying pod and a connection device for connecting the conveying pod to the flight module. The connection device has an elongated shaft, one end of which is attached to the conveying pod, and a coupling
(Continued)

device for connecting the flight module to another end of the elongate shaft of the transport module.

20 Claims, 16 Drawing Sheets

(30) Foreign Application Priority Data

| Dec. 15, 2017 | (DE) | 102017130253.0 |
| Dec. 15, 2017 | (DE) | 102017130254.9 |
| Dec. 15, 2017 | (DE) | 102017130255.7 |

(51) Int. Cl.

| B60L 53/16 | (2019.01) |
| B60L 53/31 | (2019.01) |
| B60L 53/36 | (2019.01) |
| B60L 53/50 | (2019.01) |
| B64C 7/00 | (2006.01) |
| B64C 21/02 | (2006.01) |
| B64C 29/00 | (2006.01) |
| B64D 9/00 | (2006.01) |
| B64F 1/00 | (2006.01) |
| B64F 1/22 | (2006.01) |
| B64F 1/30 | (2006.01) |
| B64F 1/36 | (2017.01) |
| B64U 10/16 | (2023.01) |
| B64U 30/12 | (2023.01) |
| B64U 50/31 | (2023.01) |
| H02J 7/00 | (2006.01) |
| B64C 1/00 | (2006.01) |
| B64U 30/20 | (2023.01) |
| B64U 50/19 | (2023.01) |
| B64U 101/61 | (2023.01) |

(52) U.S. Cl.
CPC ............... *B60L 53/36* (2019.02); *B60L 53/50* (2019.02); *B64C 7/00* (2013.01); *B64C 21/02* (2013.01); *B64C 29/0016* (2013.01); *B64D 9/00* (2013.01); *B64F 1/00* (2013.01); *B64F 1/22* (2013.01); *B64F 1/362* (2013.01); *B64U 10/16* (2023.01); *B64U 20/40* (2023.01); *B64U 30/12* (2023.01); *B64U 50/31* (2023.01); *H02J 7/0013* (2013.01); *B60L 2200/10* (2013.01); *B64C 2001/0072* (2013.01); *B64U 30/20* (2023.01); *B64U 50/19* (2023.01); *B64U 2101/61* (2023.01)

(56) References Cited

U.S. PATENT DOCUMENTS

| 3,589,646 | A | 6/1971 | Mori |
| 5,996,933 | A | 12/1999 | Schier |
| 6,399,199 | B1 | 6/2002 | Fujino et al. |
| 6,598,827 | B2 | 7/2003 | Kusic |
| 9,174,733 | B1 | 11/2015 | Burgess et al. |
| 9,321,531 | B1 | 4/2016 | Takayama et al. |
| 9,536,216 | B1 | 1/2017 | Lisso |
| 9,580,173 | B1 | 2/2017 | Burgess et al. |
| 9,630,713 | B1 | 4/2017 | Von Novak, III |
| 9,650,136 | B1 | 5/2017 | Haskin et al. |
| 9,928,749 | B2 | 3/2018 | Gil et al. |
| 9,969,494 | B1 | 5/2018 | Buchmueller et al. |
| 10,308,358 | B2 | 6/2019 | Phan |
| 10,913,547 | B1 | 2/2021 | Thrun et al. |
| 2006/0266881 | A1 | 11/2006 | Hughey |
| 2011/0017865 | A1 | 1/2011 | Achtelik |
| 2012/0298790 | A1 | 11/2012 | Bitar |
| 2014/0374532 | A1 | 12/2014 | Duffy et al. |
| 2015/0012154 | A1 | 1/2015 | Senkel et al. |
| 2016/0023759 | A1* | 1/2016 | Barrett .................. B64C 27/20 244/17.23 |
| 2016/0214728 | A1 | 7/2016 | Rossi et al. |
| 2017/0116814 | A1 | 4/2017 | Storch et al. |
| 2018/0002009 | A1 | 1/2018 | McCullough et al. |
| 2018/0002013 | A1 | 1/2018 | McCullough et al. |
| 2018/0002015 | A1 | 1/2018 | McCullough et al. |
| 2018/0141647 | A1 | 5/2018 | Suzuki |
| 2018/0164835 | A1* | 6/2018 | Artemiadis ............. G05D 1/10 |
| 2018/0312267 | A1 | 11/2018 | Tian |
| 2019/0127052 | A1* | 5/2019 | Chen ..................... B64C 25/34 |
| 2020/0094959 | A1 | 3/2020 | Suzuki |

FOREIGN PATENT DOCUMENTS

| DE | 202012001750 U1 | 3/2012 |
| DE | 102013108207 A1 | 2/2015 |
| EP | 3243747 A1 | 11/2017 |
| EP | 3243750 A1 | 11/2017 |
| EP | 3482618 A1 | 5/2019 |
| FR | 1347415 A | 12/1963 |
| JP | 2002370696 A | 12/2002 |
| JP | 2011046355 A | 3/2011 |
| JP | 2014240242 A | 12/2014 |
| WO | 2013124300 A1 | 8/2013 |
| WO | 2016185572 A1 | 11/2016 |
| WO | 2017000528 A1 | 1/2017 |

OTHER PUBLICATIONS

U.S. Appl. No. 16/772,225, filed Jun. 12, 2020.
U.S. Appl. No. 16/772,228, filed Jun. 12, 2020.
U.S. Appl. No. 16/772,233, filed Jun. 12, 2020.

* cited by examiner

MODULAR AIRCRAFT

BACKGROUND OF THE INVENTION

1. Field of the Invention

The invention relates to a vertical take-off and landing modular aircraft for transporting people and/or loads.

2. Discussion of Background Information

Aircraft for transporting people and/or loads are increasingly growing in importance because they, for example, enable rapid transportation largely independently of infrastructure facilities such as roads, railways, bridges, tunnels, etc. This applies in particular to smaller aircraft that can take off and land vertically and therefore do not need a runway.

For example, WO 2013/124300 A1 discloses an aircraft that includes a plurality of electric motors and propellers that are arranged in a surface or plane. The rotor blades of the propellers and their blade roots can be made of a fiber-reinforced composite, for example carbon-fiber-reinforced plastic. In an additional example embodiment described in detail, the aircraft includes a supporting framework structure and pressure-resistant bars that are connected to each other at node points such that they form a hexagonal structure with triangular unit cells. The propellers are arranged at the nodes.

The aircraft described in WO 2013/124300 A1 has a cockpit that is similar to an aircraft cockpit that is arranged directly on the supporting framework structure, for example by means of a pivot joint.

DE 10 2013 108 207 A1 likewise discloses an aircraft that can be assembled and disassembled in a modular fashion and is suitable for the recovery of persons or objects. The aircraft includes a central module on which cantilever arms may be equipped with rotor units and a carrier module or a passenger can be arranged. In this context, the carrier module or the passenger module are connected directly to the central module without spacing.

In addition, the aircraft in DE 10 2013 108 207 A1 has rotors arranged in a plane, which each have an electric drive together with electrical power supply unit and control electronics.

Modular aircraft known based on the state of the art carry the risk of unwanted contact between the passenger or cargo to be transported and the nearby drive units which presents a significant safety problem.

Furthermore, the area by means of which the passenger to be transported accesses the passenger transport module is limited by proximity of the motor units.

In addition, seating comfort for the passenger to be transported is limited in that the design of the passenger transport module is strongly limited by the arrangement of the remaining components.

The proximity between the passenger transport module and the motor units is also expected to expose the passenger to be transported along with significant noise exposure.

The object of the invention is to provide a versatile modular vertical take-off and landing aircraft that avoids or at least reduces the disadvantages mentioned above. In particular, the intent is to improve the safety and comfort of persons to be transported. In addition, improving the aerodynamics and stability of the aircraft, and thus improving overall operational safety, is desirable.

This problem is solved by the object of the independent claim. Advantageous enhancements to the invention are indicated in the dependent claims.

SUMMARY OF THE INVENTION

The vertical take-off and landing aircraft according to the invention has a flight module with a plurality of drive units arranged on a supporting framework structure, where each drive unit comprises an electric motor and at least one propeller operatively connected to the electric motor.

The aircraft comprises a so-called VTOL ("vertical take-off and landing") aircraft. The purpose of the flight module is to power the aircraft.

The drive units may alternatively be arranged on one or more planes, such as on the same plane as the supporting framework structure and/or above and/or below the supporting framework structure.

In addition, multiple drive units can be arranged one above the other coaxially to the rotor shaft of the electric motors.

The supporting framework structure can comprise radially, axially and tangentially arranged, preferably straight or curved framework struts, which for example may be connected together at node points using the connecting pieces assigned to the supporting framework structure, e.g. T-pieces, and if necessary to a central unit arranged centrally in the supporting framework structure.

The interconnected framework structure struts preferably form a self-contained supporting framework structure i.e. without any free-ended framework structure struts, which is therefore particularly rigid.

For example, the framework struts can be arranged in such a way that a flat, hexagonally braced supporting framework structure is formed. For this purpose, six radially evenly spaced framework struts can be arranged so that two adjacent radially arranged framework struts form an angle of approximately 60°.

The connecting pieces can preferably be designed to enable a flat, flush fit of the framework struts in the connecting piece. It is particularly preferable that an arm of the connecting piece completely encloses the framework strut in the manner of a plug-in connection. Such a fitting enables a specific alignment, and a more even distribution of the bearing forces.

To form a supporting framework structure with a flat, hexagonal shape, three arms of the connecting piece can be arranged in one plane, with an angle between the arms of approx. 60°. The connecting pieces can be formed of an upper and lower shell, to facilitate assembly and maintenance.

To increase the strength of the joint, the framework struts can be joined together in a form-fitting manner inside the connecting pieces. The ends of the framework struts can be designed so that they can be slotted together.

The propellers can have two or more rotor blades, which are attached to a hub by their blade roots.

The rotor blades are shaped and orientated in such a way that the surrounding air flows around them asymmetrically when the propeller rotates, thus generating a lift force in the flight module. The lift force of the flight module can be variable, whereby the propellers can have a fixed or directionally adjustable shaft to adjust the tilt angle of the propellers, and the rotor blades can also have a fixed or adjustable shaft for adjusting their angle of incidence.

One or more propellers can be assigned to each electric motor, where the electric motor is operatively connected to the propeller(s), i.e. it drives the propeller(s). For this purpose, the propeller(s) and associated electric motor can be bolted together.

Multiple propellers arranged coaxially to the rotor shaft can be assigned to one electric motor and can be arranged above and/or below the electric motor.

The electric motors can be designed as brushless DC motors. These motors are characterized by low maintenance requirements. In addition, each drive unit can have a motor controller so that each drive unit can be controlled independently of the other drive units.

For sealing, e.g. against water or dirt, and/or to reduce aerodynamic drag, a cover can be fitted to each drive unit, e.g. in the form of a so-called spinner for streamlined covering of the hub.

For example, the flight module in the hexagonal embodiment of the supporting framework structure can have a total of 18 drive units.

The flight module or the individual propellers can be designed without shrouding or with a shroud. The shroud can be designed as a protective grille, for example. A shroud increases safety for ground crew and passengers by preventing accidental contact with the rotor blades. The design without shrouding has the advantage of a lower weight of the flight module and simplifies propeller maintenance.

A number of drive units, e.g. some or all of the drive units, can be connected to the supporting framework structure, preferably to the framework struts, by means of force-fitting and/or form-fitting fastening means.

Preferably the fastening means is designed as a bracket which at least partially encloses a framework strut.

For example, the bracket can be designed in such a way that it encloses the hollow profile of the framework strut in a flush manner, i.e. the shape of the bracket follows the outer contour of the strut.

To increase stability and stiffness, the bracket can have an omega-shaped cross-section so that the torque of the drive units as well as bending and vibration loads can be compensated.

The bracket can be bolted, glued or riveted to the framework strut or joined to it by means of tightening a clamp connection.

The brackets can have an area that is angled to one side to accommodate the drive units. In this area, the bracket can be joined to the drive unit by means of a bolted or riveted connection.

The force-fitting and/or form-fitting connection can enable better positioning of the drive units on the supporting framework structure and better power transmission from the drive units to the supporting framework structure.

The fastening means, e.g. the bracket, can be made in several parts, preferably in two parts, to simplify assembly and removal.

In addition, the aircraft according to the invention has a transport module with a conveying pod which serves to enclose the people and/or loads to be transported and a connection device for connecting the conveying pod and the flight module. The connection device has a longitudinally extended shaft that connects to one end of the conveying pod, whereby the connecting device may be detachably attached to the conveying pod.

For example, the shaft can be designed as a straight rod with, for example, a rectangular cross-section with edges rounded over the circumference of the rod or with a round or ovular cross-section.

The shaft can preferably be designed to be essentially rotationally symmetrical, e.g. in the form of a straight circular cylinder, whereby the longitudinal extension of the cylinder corresponds to the length of the shaft and the top and bottom surfaces may be described as the narrow side.

Preferably the shaft can be as thin as possible, e.g. a narrow diameter. A shaft that is as thin as possible and designed to be rotationally symmetrical significantly reduces the mass and aerodynamic resistance of the shaft and thus of the transport module.

According to the invention, one end of the shaft is connected to the transport pod, which serves to enclose the people and/or loads to be transported.

The transport pod is formed such that it leads into the narrow side of the longitudinal shaft. The narrow side of the shaft can be axially arranged in relation to the transport pod. Arranging the shaft centrally in relation to the transport pod in this manner minimises bending stress on the shaft, e.g. when coupling or uncoupling the flight module or when landing the aircraft.

Preferably, the connection between the transport pod and the shaft may be designed to be rigid. For example, the conveying pod and shaft may be materially bonded to each other, Maintenance of a certain distance between the conveying pod and the flight module may advantageously be achieved by forming a longitudinal shaft and attaching the conveying pod to such shaft.

In particular, the shaft may be elongated such that a safety height clearance can be created for the coupling device above the transport enclosure so that appropriate safety clearance can be assured between the transport enclosure and the flight module in the coupled position. The safety height clearance may correspond to the longitudinal extension of the shaft and is intended such that an adult using the transport module cannot touch the coupling device and the flight module in the coupled position from a standing position. The safety height clearance may—assuming a usable height of the conveying pod of for example 2 m—be at least 0.5 m and preferably 1.0 m and additionally preferably 1.5 m.

The safety height clearance is to be selected in such a way that the safety risk for a passenger using the transport pod is minimized by, for example, preventing contact by such a passenger with the coupled flight module when using the transport module.

The longitudinal extension of the shaft and the height of the transport pod may thus have a total height of 2.5 m above the mounting surface of the conveying pod. This means that the coupling device and the coupled flight module can be operated, at the least, above the possible reach of a standing adult.

This can significantly increase operational safety by effectively preventing undesired contact between an active person and/or load to be transported and the flight module. In addition, maintenance of a certain degree of clearance my result in a reduction of the noise load for persons being transported.

In addition, spacing of pod away from the flight module allows the pod to be located outside the downdraft of the flight module propellers, which results in reduction in aerodynamic drag and improved aerodynamics.

Furthermore, the specific design for the transport pad can be completed largely independently of the flight module given that no adaptation with regard to the flight module is necessary.

The aircraft may optionally be equipped with a stand mechanism designed to ensure the secure positioning of the landed aircraft when parked, e.g., the ground. The standing mechanism may be designed to fold in and out so that that standing mechanism may be folded in during flight in order to improve the aircraft's aerodynamic characteristics. The standing mechanism can be located on the transport module, preferably on the transport pod, and/or on the flight module. If the standing mechanism is designed to be fold in and out, the standing mechanism may be folded flush to the transport module and/or the flight module during flight.

The standing mechanism may be made of metal, plastic and/or a fiber composite material.

In addition, the aircraft according to the invention has a coupling device for connecting the flight module to another end of the longitudinal shaft of the transport module, where a first part of the coupling device is arranged on the flight module and a second part of the coupling device is arranged as a counterpart on the other end of the longitudinal shaft of the transport module.

In this context, the other end of the longitudinally extended shaft refers to the end opposite the conveying pod. In other words, the coupling device may connect the second of the two narrow ends of the shaft with the flight module.

The coupling device is designed for coupling and uncoupling a flight module, thus creating a detachable connection between the shaft and a flight module. In order to improve aerodynamics, the coupling device may connect the transport module, preferably centrically, i.e. axially, on the shaft and/or centrically with regard to the supporting framework structure or centrically on a central unit of the flight module.

Arranging the shaft centrally in this manner minimizes bending stress on the shaft, e.g. when coupling or uncoupling the flight module or when landing the aircraft.

Preferably, the coupling device may be designed as an automatic coupling device. This enables the flight module to be automatically coupled with the transport module. Coupling may be performed quickly and safely given that manual coupling is not necessary.

The coupling device may be designed to be controllable. This can be advantageous for controlling the coupling process remotely. In addition, the coupling or uncoupling can be carried out depending on various conditions. For example, uncoupling may only be possible if the conveying pod is in contact with the ground. This can help to increase safety.

The coupling device can be designed as an articulated coupling, so that the transport module can be coupled with the flight module in a variety of orientations, making angular adjustments and/or inclination adjustments between the flight and transport module In other words, the tilt angle $\alpha$ for the flight module can be adjusted. The tilt angle $\alpha$ is defined as the angle formed by a line of gravity perpendicular to the earth's surface and plane E of the supporting framework structure. The line of gravity corresponds to a longitudinal axis of the transport module's shaft when the transport module is mounted vertically on the flight module.

The tilt angle $\alpha$ can, for example, be varied between 30° and 150°. In the case of a tilt angle $\alpha$ of 90°, the plane of the flight module's supporting framework structure is arranged perpendicularly to the line of gravity and thus parallel to the earth's surface. When positioned in this manner, the line of gravity may correspond exactly to the center axis of the flight module. When the flight module decelerates, the plane E of the supporting framework structure may be angled upward in the direction of flight, i.e. the tilt angle is set at $\alpha >$ When the flight module decelerates, the plane E of the supporting framework structure may be angled upward in the direction of flight, i.e. the tilt angle is set at $\alpha >$ This also allows the tilt angle of the transport module to be varied in relation to the flight module in such a way that, for example, it is possible to ensure a comfortable vertical alignment of the transport module in relation to the line of gravity during flight even in the event that different control input has been input for the inclination of the flight module. Variability of the inclination angle of the transport module in relation to the flight module, such that at any inclination of the flight module results in the essentially vertical alignment of the transport module in relation to the line of gravity may improve flight comfort for passengers and would make it unnecessary to attach loads to the conveying pod or, at the least, simplify attachment.

In addition, the center of gravity of the aircraft can be centered in a central area of the flight module, so that as to improve the steering and control capabilities of the aircraft.

The coupling device may be designed such that the inclination of the coupling device, i.e. the inclination of the transport module in relation to the flight module, may also be adjusted during flight and/or compensating torque may be automatically adjusted, for example, by having the mass of the transport module, in particular the mass of the conveying pod, rotate around a point of the coupling device that, in the closed position, functions as a floating bearing.

In addition, the center of gravity of the aircraft can be centered in a central area in relation to the flight module during flight, so that as to improve the steering and control capabilities of the aircraft. Torque created by the persons and/or loads to be transported may be slightly compensated by means of design as an articulated coupling device despite the gap in relation to the conveying pod and the coupling device resulting from the shaft.

The coupling device may preferably be designed so that correct coupling of the flight module is always assured under any effective load. Furthermore, it can have a control mechanism to confirm a proper connection and a safeguard mechanism to manually release the connection in the unloaded state. The coupling device can have a damping device, which can be designed to absorb hard landing impacts, for example.

The coupling device permits the transport and flight modules to be combined flexibly. In other words, different types of transport and/or flight modules can be exchanged for each other. This flexibility can be further increased by an automatic coupling device.

For example, different transport modules can be coupled to the same flight module, whereby the transport modules can use different designs. For example, a first transport module may be designed to transport people, while a second transport module is designed to transport loads. Similarly, different flight modules may be coupled with the same transport module. The transport modules can differ from each other, for example, in the number and/or arrangement of the drive units. For example, with a higher or lower number of drive units may be selected depending on the load to be transported and/or flight conditions (wind force and direction, altitude, etc.).

The total weight of the aircraft 1 in this embodiment is preferably less than 472.5 kg (including rescue system) in line with the certification regulations for ultralight aircraft, additionally preferably less than 450 kg (without rescue system), in order to minimize material stress and risk in the event of a crash resulting from too large of an impact force. Preferably, the use payload will be at least 150 kg, to allow the transport of overweight people.

By virtue of the ideal design of the supporting framework structure and the compact arrangement of the drive units, the dimensions of the aircraft are less than 8 m in diameter, so that space-saving storage of the aircraft is possible and that flight corridors of smaller dimensions can also be used by the aircraft.

The maximum hovering power may be 5 kW per propeller and the maximum total output may be 60 kW when hovering. For example, the range can be at least 30 km and the minimum cruising speed 60 km/h. The noise emission should not exceed 60 db (A), especially in the conveying pod. If necessary, the conveying pod can be equipped with sound insulation. The aircraft may be equipped with a lightning protection system to increase safety. For example, the conveying pod may be designed to be electrically conductive so that it forms a Faraday cage. For example, an electrically conductive coating can be applied to the conveying pod.

The modular aircraft advantageously combines ultra-light construction and electromobility, so that people and/or loads may be transported in an environmentally friendly, safe and fast manner. In particular, the modular aircraft can be easily integrated into existing urban structures, as it requires little space and, depending on its design, can also be operated self-sufficiently in terms of energy.

Optionally, a device for the targeted deflection of the exhaust air flow from the propellers may be arranged below the flight module in order to reduce aerodynamic drag from the transport module and/or to create improved lift or propulsion.

According to various alternate embodiments, air guiding devices may be included as lift or flight aids in order to increase the efficiency of the aircraft and to stabilize and/or improve aerodynamics both when climbing or descending as well as when cruising (forward flight).

The air guiding devices may preferably be arranged on the transport module, preferably on the conveying pod, in either a stationary or movable manner. The air guiding devices can be designed like wings, for example flat or slightly curved. As an option, the position of the air guiding devices relative to the flight module and/or the transport module or the conveying pod can be designed to be rotatable or movable linearly.

In one alternative embodiment, a wing-shaped planar plate that is essentially parallel to the longitudinal extension of the shaft can be arranged as an air guiding device on a rear side of the transport module opposite to the flight direction of the aircraft. Air guiding devices arranged in this manner may, for example, function as a side stabilizer for the aircraft which steers the transport module sideways and, during aircraft flight, maintains it in a stable position in relation to the vertical or longitudinal axis of the shaft.

In an additional embodiment, one or more air guiding devices may be located in the lower part of the conveying pod and may, for example, be attached using mounting brackets. The mounting brackets can follow the shape of the lower part of the conveying pod.

The mounting brackets may be mounted on the conveying pod and the air guiding devices may be mounted on one mounting bracket each. This allows the air guiding devices to be folded close to or far away from the conveying pod as required.

During aircraft take-off and landing, the air guiding devices can be folded on to the conveying pod in order to avoid any negative effect on air flow. During cruising flight (forward flight) of aircraft with an attached transport module, the air guiding devices can be folded out and, due to their aerodynamic lift, help carry the transport module. The flight module must therefore perform less load-bearing work and can generate more power for forward flight.

In an additional embodiment, one or more air guiding devices may be attached to the framework strut on the flight module or on the connectors to the connection between the framework struts and the supporting framework structure. The air guiding devices can be designed like wings, for example flat or slightly curved.

Optionally, the position of the air guiding devices relative to the flight module can be designed to be rotatable or movable linearly. For example, the wing-like air guiding devices can be folded up against and unfolded from the supporting framework structure and/or be mounted so as to be rotatable about their longitudinal axis.

These air guiding devices can support lift effect for the flight module and can also be used as steering and flight aids for the flight module. This increases the efficiency of the flight module and can aid the stabilization and/or improvement of the flow characteristics of the flight module and thus to controllability of the aircraft.

The air guiding devices in the embodiments described above may, at least in part, be designed to be controllable in their alignment to the transport module and/or the flight module's supporting framework structure, in particular with an angle of incidence ß that is variable in relation to the transport module and/or the supporting framework structure of the flight module, so that their lift and/or steering function may be adapted efficiently based on flow conditions prevailing during the aircraft's flight.

In particular, the air guiding devices attached to the supporting framework structure and mounted so as to be rotatable about their longitudinal axis can each be variable in an angle of incidence ß enclosed between the plane E of the supporting framework structure and a middle cross-section plane of the air guiding device. The angle of incidence ß can preferably be variable in a range between 110° (the wing section of the air guiding device facing in the direction of flight is set steeply upwards) and 260° (the wing section of the air guiding device facing opposite the direction of flight is set steeply upwards). With an angle of incidence ß of 180°, the air guiding devices and the supporting framework structure are in one plane. If there are multiple air guiding devices, the respective angles of incidence ß can be variable independently of each other.

By varying the angle of incidence ß, for example the lift function of the flight module can be influenced according to the flow conditions. If the air guiding devices are each orientated with different angles of incidence ß, the steering function of the flight module can be influenced, for example.

In one embodiment, the angle of incidence ß can be variable depending on the tilt angle α. If the flight module is tilted relative to the line of gravity S, reduced lift due to the tilt of the flight module can be increased again by suitable variation of the angle of incidence ß. When the flight module is accelerating with the plane E of the supporting framework structure tilted downwards in the direction of flight (α<90°), the air guiding devices can be adjusted in the opposite direction to this, i.e. with an angle of incidence ß greater than 90° and less than 180°. When the flight module is decelerating with the plane E of the supporting framework structure tilted upwards in the direction of flight (α>90°), the air guiding devices can be adjusted in the opposite direction to this, i.e. with an angle of incidence ß greater than 180° and less than 270°.

Such lift aids not only improve the lift of the flight module, thus reducing propeller power and saving energy, but also e.g. improving the controllability and flight stability of the aircraft.

According to various alternate embodiments, the flight module may include a central unit that, preferably, may be arranged centrally to the center axis and/or the symmetrical axis of the flight module. For example, the central unit may have a housing, e.g. in the shape of a semi-sphere or an ellipsoid. For example, the central unit can consist of two halves that are joined, e.g. bolted together.

Openings may be provided for maintenance and for carrying out small repairs. The central unit may also be designed to support struts of the supporting framework structure, e.g. where one end of the framework struts is attached to the central unit and they extend radially outwards from the central unit.

The central unit may be designed for example for the storage or arrangement of objects, such as auxiliary equipment or technical functional units. For example, the central unit may have a rescue system, e.g. with a parachute for shooting out, in the upper part of the central unit.

The central unit may have technical functional units, such as control, positioning and/or communication technology and/or a charging module.

The housing of the central unit may have one or more cavities for storing or arranging the auxiliary equipment and/or technical functional units. The auxiliary equipment or technical functional units may be arranged in the cavities and/or on the housing, for example on the top or side in the free space between the radial framework struts.

The integrated positioning technology can for example use positioning signals e.g. from a global satellite navigation system such as GPS, Galileo, GLONASS, Beidou etc. to determine the location of the aircraft and to determine and control the flight route and destination of the aircraft.

The integrated communication technology can be designed for internal and/or external communication, where internal communication means communication between the modules of the aircraft or communication with modules that are intended directly for use with the aircraft, for example communication between the flight module and transport module or aircraft and ground control station.

External communication means for example communication regarding flight permission, flight route, location etc. for air traffic control or exchanging information with meteorological services.

In addition, the central unit may also have software and/or hardware for carrying out a landing approach to a take-off and landing station.

The positioning of auxiliary equipment and technical functional elements in or on the centrally arranged central unit can enable a center of gravity position focused in the center of the aircraft, thus improving the controllability of the aircraft.

According to various embodiments, the flight module, e.g. the central unit of the flight module and/or the transport module, preferably the conveying pod, may include a charging module.

The charging module can store one or more rechargeable energy sources, e.g. in the form of rechargeable batteries or super-capacitors, a charging device and/or solar cells.

The charging device may be designed to transfer electrical energy from an external charging station to the energy storage device(s).

The energy storage devices may be designed to store the electrical energy that is transferred and/or self-generated by means of solar cells, and to supply energy to the transport module and/or the flight module, e.g. the drive units.

As a result, the transport module and/or the flight module may be designed to be self-contained from a power standpoint whilst power may be supplied from within the transport module and/or flight module.

No conductive connection via the connecting device is necessary if both the transport module and the flight module have their own power supply.

The rechargeable batteries may, for example, be arranged in and/or on the conveying pod and/or in and/or on a central unit in the flight module, whereby the solar panels may be mounted on the upper surface of the conveying pod and/or on the supporting framework structure of the flight module.

According to various alternate embodiments, the supporting framework structure for the flight module may comprise support arms connected to each other at node points and a plurality of the drive units may be arranged outside of the node points.

The arrangement of a plurality of the drive units, i.e. one or all of the drive units, creates improved stability for the flight module given that this permits the propeller force to be directed to the supporting framework structure outside of the node points. In this way, the node points, which already experience high loads from the framework struts, are not additionally stressed by the propulsion forces.

This allows the supporting framework structure to be built using less material, i.e. lighter in terms of mass and cheaper to produce.

The arrangement of the required drive units outside of the node points additionally results in the minimization of the support arms and node points required thus simplifying and lowering the costs of the supporting framework structure.

In addition, the minimized design of the supporting framework structure ensures a lower mass while also producing less coverage of the propellers' downwash area, which in each case improves the efficiency of the flight module and thus reduces fuel consumption during use of the aircraft.

In addition, such a design results in improved functional safety and therefore improved operational safety for the flight module and thus for the aircraft.

According to various alternate embodiments, the flight module may include a central unit that, preferably, may be arranged centrally to the center axis and/or the symmetrical axis of the flight module. In other words, the drive units can be arranged symmetrically around a common center with the center axis of the flight module and distributed in one or more planes. By this means and furthermore also by means of the central unit arranged centrally in the flight module, a stable flight characteristic of the aircraft can be achieved.

For example, a plurality of the drive units can be arranged at an identical radial distance (radius) from the center axis of the flight module and thus in a ring around the center axis of the flight module.

Preferably, the radial distance is the distance between the center axis of the flight module and the hub axis for the respective propeller of the drive unit.

The number of drive units with identical radial distance from the center axis of the flight module form a ring in an imaginary circular-arc-shaped connecting line with a constant radius.

The drive units can also be arranged in several rings with identical radius or ring diameter on several planes around the center axis.

The drive units can be arranged in several rings (R1, R2, R3) with different radius or ring diameter (DR1, DR2, DR3) in one plane around the center axis of the flight module.

By arranging a plurality of drive units, especially in one or more rings, for example, a first group of drive units can have a first identical radial distance from the center axis of the flight module and form a first ring (R1). A second group of drive units can have a second, identical radial distance from the center axis and form a second ring (R2) and so on.

A third ring (R3) with the drive units at the greatest distance from the center axis of the flight module can form the outer ring, while the first ring (R1) forms an inner ring with the smallest distance from the center axis of the flight module.

The ring diameters of the rings and the diameters of the propeller rotors can be selected depending on the dimensions of the transportation capsule to adjust the downdraft generated by the propellers of the drive units with respect to the position and size of the transportation capsule.

The diameter of a propeller rotor is to be understood as the diameter of the circular line generated by the outer ends of the rotor blades during the rotational movement of the propeller rotor blades.

Thus preferably the ring diameter of the first, inner ring (R1) can be arranged so that the vertically projected circular lines of the rotors of the drive units of the first, inner ring do not overlap the vertically projected area of the transportation capsule.

This can make a sustained improvement to the aircraft's aerodynamics.

Of course, the design of the supporting framework structure, in particular the arrangement of the framework struts, also determines the specific position of the drive units on the wing structure If, for example, the struts in the supporting framework structure are arranged hexagonally, a first inner ring for example can have six drive units each centered on one of the six radially outwardly pointing struts, while a second ring can have another six drive units each at the outer end of the radially outwardly pointing struts.

A further six drive units can each be arranged centrally on one of the framework struts which connect the radially outwardly pointing wing struts and radially close the supporting framework structure, and form a third ring.

The direct, straight connecting lines of the hub axes of the propellers of a ring can therefore essentially form a hexagon.

According to various embodiments, the rotors of the propellers of a plurality of drive units can have different diameters.

It is possible that all rotors have a different diameter or that a first group of rotors has a uniform diameter, but a second group of rotors has a diameter different than that of the first group of rotors.

For example, rotors of the propellers of the drive units of a ring can have a uniform diameter. Alternatively, the propeller rotors for the drive units within a ring may have different diameters.

For example, rotors of the propellers of the drive units of a ring can have alternately different diameters.

By arranging drive units with different rotor diameters, the area utilisation of the air space above the supporting framework structure can be optimized and thus the lift force of the flight module, and thus of the aircraft, can be improved.

If three rings of drive units are provided, for example, then for example the rotors of the propellers of the drive units of the first ring R1 can have a first uniform diameter d1, while the rotors of the propellers of the drive units of the second ring R2 can have a second uniform diameter d2, while the rotors of the propellers of the drive units of the third ring R3 can have a third uniform diameter d3.

Furthermore, it is possible that the rotors of the propellers of the drive units of a first and a second ring R1, R2 have a uniform diameter and the rotors of the propellers of the drive units of the third ring R3 have a different diameter, so that in total there are only two groups of propellers of different diameters.

This reduces manufacturing costs, since only two propeller groups with two different rotor diameters have to be manufactured.

In their own way, all variants enable improved airspace utilization, since there are fewer gaps in the airspace above the supporting framework structure that cannot be filled by a rotor circle of the propellers, as well as a more favourable load distribution within the flight module and thus within the aircraft.

However, to simply manufacturing, assembly and maintenance, all propeller rotors can also have a uniform diameter.

According to further embodiments, a plurality of framework struts, i.e. some or all of them, can have a hollow profile.

Framework struts with hollow profile achieve a favourable mass reduction, which has the benefit of improving the efficiency of the flight module and thus of the aircraft.

If the hollow profile has at least partially curved wall surfaces, it also has a beneficial effect on the aerodynamics of the flight module and thus of the aircraft, which may lead to a reduction in aerodynamic drag and to improved efficiency of the flight module. In addition, the curved wall surfaces of the hollow profile have a beneficial effect on the buckling properties of the framework struts.

Designing the framework struts as hollow profiles allows a signal connection to the drive units and/or a power supply line for the drive units to be arranged inside the framework struts so that these are largely protected from environmental influences.

The hollow profile of the framework strut, according to further embodiments, can have a profile cross-section that is extended longitudinally in the effective direction of the drive units, preferably an oval profile cross-section.

Due to the uniform effective direction of the drive units, there is a main direction of the bending load on the framework struts, which can be advantageously compensated by the longitudinally extended design of the profile cross-section with its longitudinal sides orientated vertically.

The longitudinally extended profile cross-section can, for example, be formed by an oblong, elliptical, oval or combined oval profile cross-section, where the longitudinal sides of each of the longitudinally extended profile cross-sections are always extended vertically in the direction of the effective direction of the drive units.

The profile cross-section of the hollow profile with its long sides orientated vertically in the direction of the effective direction of the drive units can support a higher bending load based on the operational direction of the drive units.

The oblong profile cross-section means a cross-section whose boundary line is formed by two circular arcs of the same or different radii and two straight sections.

The boundary of an elliptical cross-section is composed of an infinite number of different radii.

Preferably, the hollow profile has an oval profile cross-section. An oval cross-section means a cross-section whose boundary line is formed by two different radii.

A combined oval profile may include more than two, for example three or four radii.

A hollow profile with an elliptical, oval or combined oval cross-section profile, comprising solely curved surfaces, is also less susceptible to buckling than an oblong profile cross-section with flat surfaces.

In addition, the oval or combined oval cross-section of the hollow profile may offer an even more advantageous ratio of cross-sectional area to moment of inertia due to the larger radius on its narrow sides compared to the tapered elliptical cross-section. The cross-section of the hollow profile can be adapted to the force path and the expected mechanical loads, preferably in thickness and shape. For example, the hollow profile of the framework struts can have a variable, i.e. changing wall thickness along the longitudinal extension of the framework strut and/or in the circumferential direction of the framework strut.

According to various embodiments, the conveying pod may have an aerodynamically advantageous shape, for rotationally symmetrical and/or substantially drop-shaped, so that when in flight, the static aerodynamic drag of the conveying pod on the one hand and, on the other the effect of flow around the conveying pod resulting from rotor operation of the flight module (dynamic air resistance), can be further reduced.

The drop-shaped form of the conveying pod may thus preferably extend in essentially the direction of the vertical center axis of the flight module.

The drop-shaped form of the conveying pod can flow into the longitudinally extended shaft, i.e., the conveying pod may have a lower broad, rounded area which tapers in an upper, narrow area in the direction of the shaft.

Preferably, in order to create an aerodynamically advantageous shape, the conveying pod may have an interface area for connecting the shaft that has a cross-sectional taper for a transition to the cross-section of the shaft.

The drop-shaped form may be reduced in width, e.g. transverse to the aircraft's primary flight direction, in order to generate as little aerodynamic drag as possible during flight operation.

The conveying pod may include opaque and transparent surfaces. The conveying pod may include one or more, for example, one or more, e.g. two, doors and/or flaps, in order to people who are to be transported may enter or exit. Preferably, two doors can be arranged opposite each other and designed to be foldable or slidable to enable quick, safe and user-friendly entry and exit or loading and unloading.

The conveying pod can also be designed to be tightly sealed. This enables fast and cost-effective air conditioning of the interior of the conveying pod and protects people or loads to be transported from environmental effects and air flow in flight.

If the conveying pod is intended to transport people, it may contain seats and safety devices, such as seat belts and/or airbags.

The conveying pod may include climate control systems, e.g. a heater and lighting, in order to increase comfort.

In addition, the transport module may be equipped with, for example in the conveying pod, hardware and software, for purposes of inputting the destination, for communications with the flight module, other aircraft or ground stations, to operate systems within the transport module or aircraft, etc.

In addition, one or more displays may be equipped to show flight information, aircraft status information, maintenance programs, etc.

Furthermore, the hardware and software may offer options for internal flight communications and coordination, e.g. with ground control station. For example, an aircraft status report or a status report regarding loading or ascent of the aircraft may be communicated.

According to other alternate embodiments, the supporting framework structure and/or the central unit and/or some number of the drive units may include components made of fiber composite material or consist of fiber composite material.

Thus, for example, a number of the framework struts and/or connecting pieces and/or fastening means of the supporting framework structure for attaching the drive units and/or hubs of the propellers and/or the housing of the central unit can include a fiber-reinforced composite or consist of a fiber-reinforced composite.

The fiber-reinforced composite can for example be a fiber-reinforced plastic such as carbon-fiber, glass-fiber or basalt-fiber-reinforced plastic.

If, for example, the central unit has communication hardware, glass-fiber-reinforced plastic can preferably be used to avoid impairing the functionality of the communication hardware.

In one alternate embodiment, the framework struts can be formed from a pultruded hollow profile made of fiber-reinforced plastic, e.g. carbon-fiber reinforced plastic.

According to other alternate embodiments, the transport module may include a fiber composite material or consist of a fiber composite material. Preferably, the conveying pod and/or the shaft may include a fiber composite material or consist of a fiber composite material.

The fiber composite material can include special textile fiber reinforcement elements. The textile fiber reinforcement can be incorporated into a plastic matrix in the form of flat or ribbon-like woven, knitted, stitch-bonded or braided fabric.

The use of fiber-reinforced composites improves the flight module's stability to mass ratio, since the components made of fiber-reinforced composites have a low mass and at the same time good to very good mechanical properties, such as strength, e-module and impact strength.

Preferably, the fiber composite material may have unidirectionally arranged reinforcing fibers.

The reinforcing fibers can be concentrated and essentially uniformly aligned as so-called UD fiber straps, which are used in differentially arranged layers within the fiber composite material to compensate for certain high mechanical loads that may occur on the framework struts for example.

For example, tensile, compressive and/or bending loads within the framework struts can be absorbed by UD fiber straps made of unidirectional reinforcing fibers, while torsional and/or shearing stresses can be compensated by fibers aligned at an angle of +/−45°, e.g. in a fabric or scrim.

It advantageous to use a textile fiber reinforcement in the preform of the framework struts to compensate for the stress that occurs, for example as follows:
 Alternate arrangement of individual fiber layers with fibers aligned at an angle of +/−45° through use of winding;
 unidirectional, axially running threads as straps on the top and bottom of the framework struts,
 final outer fiber layer with fibers aligned at an angle of +/−45° through the use of braiding.

The fiber structure with crossed and waved fibers that is created by braiding increases the robustness of the framework struts.

In addition, the outer layer comprising a fiber fabric composed of fibers arranged in an angle of +/−45° compensates, in particular, the torsional stress on the framework struts.

According to various alternate embodiments, the aircraft may include a control unit. This control unit can be designed and configured, for example, to output a control signal to switch the drive units on or off. Alternatively or additionally, the control unit can be set up and designed to output a control signal for opening or closing the coupling device and/or for adjusting the tilt angle α, i.e. the inclination of the transport module relative to the flight module. The coupling device can accordingly be designed as a controllable coupling device. Alternatively or additionally, the control unit can be designed to output a control signal for adjusting the angle of incidence ß. In addition, the control unit may control additional processes, e.g. opening and closing the door of the conveying pod.

BRIEF DESCRIPTION OF THE DRAWINGS

Further advantages of the present invention are evident from the illustrations and the associated description. They show.

DETAILED DESCRIPTION OF EMBODIMENTS OF THE INVENTION

Figure 1:
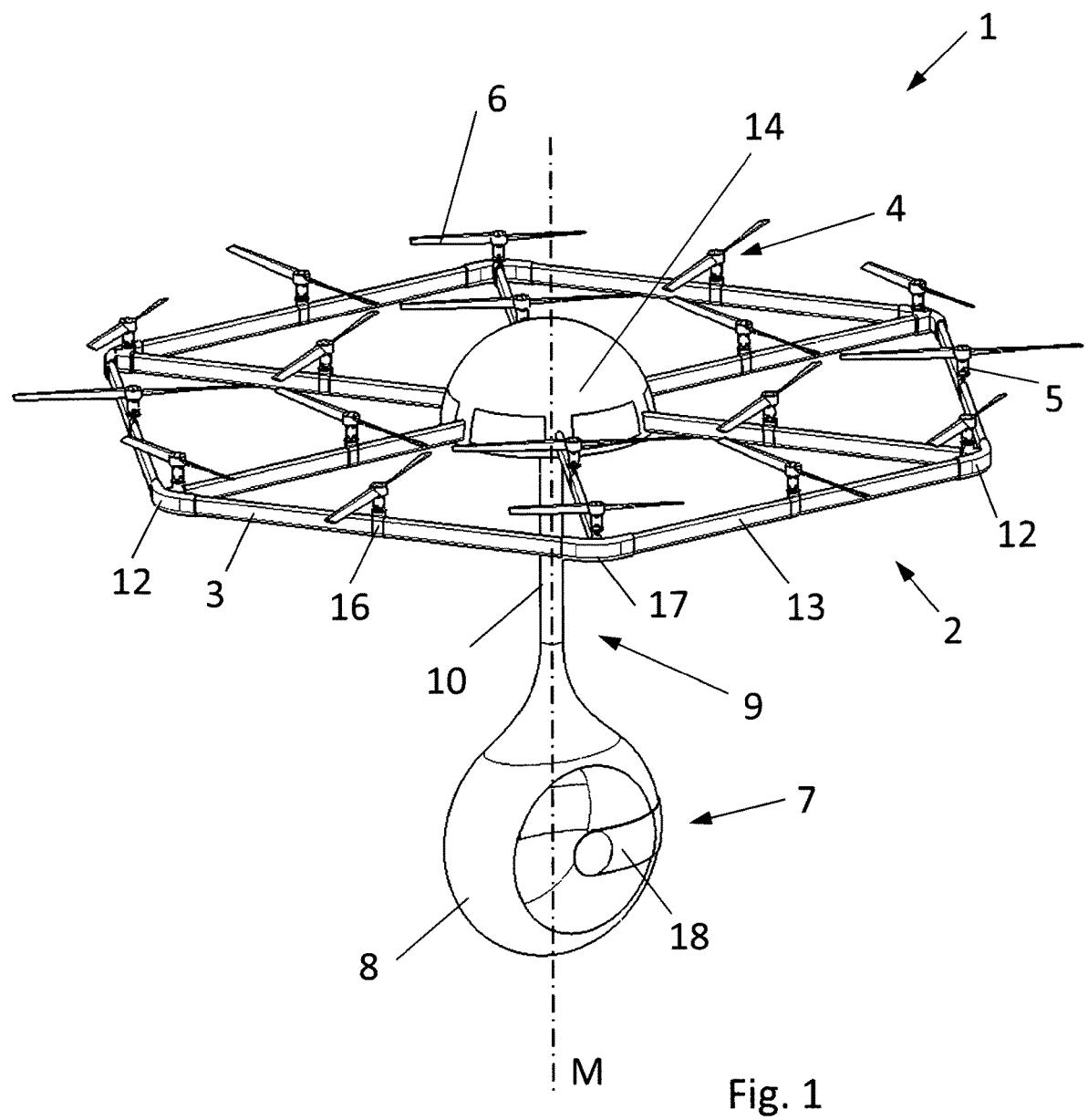
FIG. 1 Example depiction of a modular aircraft.

In the examples explained below, reference is made to the accompanying drawings, which form part of the examples and in which specific embodiments in which the invention can be put into practice are shown for illustrative purposes. In this respect, directional terminology such as "top", "bottom", "front", "back", "forward", "rear" etc. is used with reference to the orientation of the described Figures. Since components of embodiments can be positioned in a number of different orientations, the directional terminology is used for illustrative purposes and is in no way restrictive.

It is to be understood that other embodiments can be used and structural or logical changes made without departing from the protective scope of the present invention. It is to be understood that the features of the various example embodiments described herein can be combined with each other, unless specifically stated otherwise. The following detailed description is therefore not to be understood in a restrictive sense, and the protective scope of the present invention is defined by the appended claims.

For the purposes of this description, the terms "connected", "joined", "attached" and "coupled" are used to describe both a direct and an indirect connection, a direct or indirect joint, a direct or indirect attachment, and a direct or indirect coupling. Identical or similar elements are assigned identical reference symbols in the drawings where appropriate.

Figure 2:
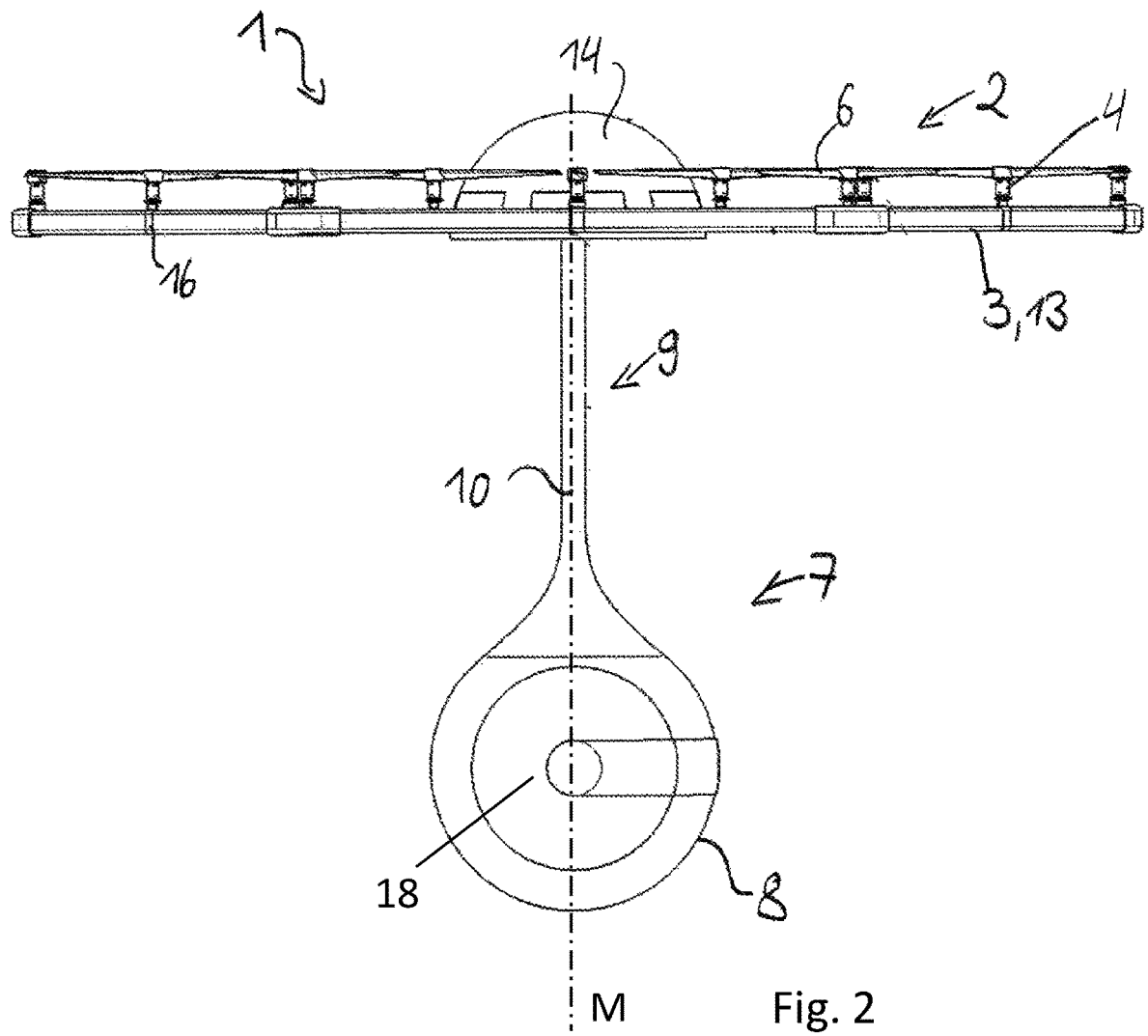
FIG. 2 Schematic representation of a side view of a modular aircraft.

FIGS. 1 and 2 show an example of a vertical take-off and landing modular aircraft for transporting people and/or loads. The aircraft 1 has a flight module 2, a transport module 7 and a coupling device 11 (not shown in FIG. 1).

FIG. 2 shows the aircraft 1 from FIG. 1 in a schematic depiction of the side view.

The flight module 2 provides propulsion for the aircraft 1.

By coupling the flight module 2 to the transport module 7, the transport module 7 may be lifted off the ground, transported and and placed on a surface via a standing mechanism, for example from the transport module 7 or the flight module 2 (not shown).

The flight module 2 is shown in FIGS. 3 to 9 and 15, the transport module 7 and the coupling device 11 are shown in FIGS. 10 to 14.

First, the flight module 2 will be described in detail with reference to FIG. 3.

In addition to a central unit 14 arranged centrally to the vertical axis of the flight module 2, the flight module 2 has a supporting framework structure 3 with multiple framework struts 13, which are joined to each other at node points 12 by means of connecting pieces 17 designed as T-pieces 5 as well as to the central unit 14.

Figure 4:
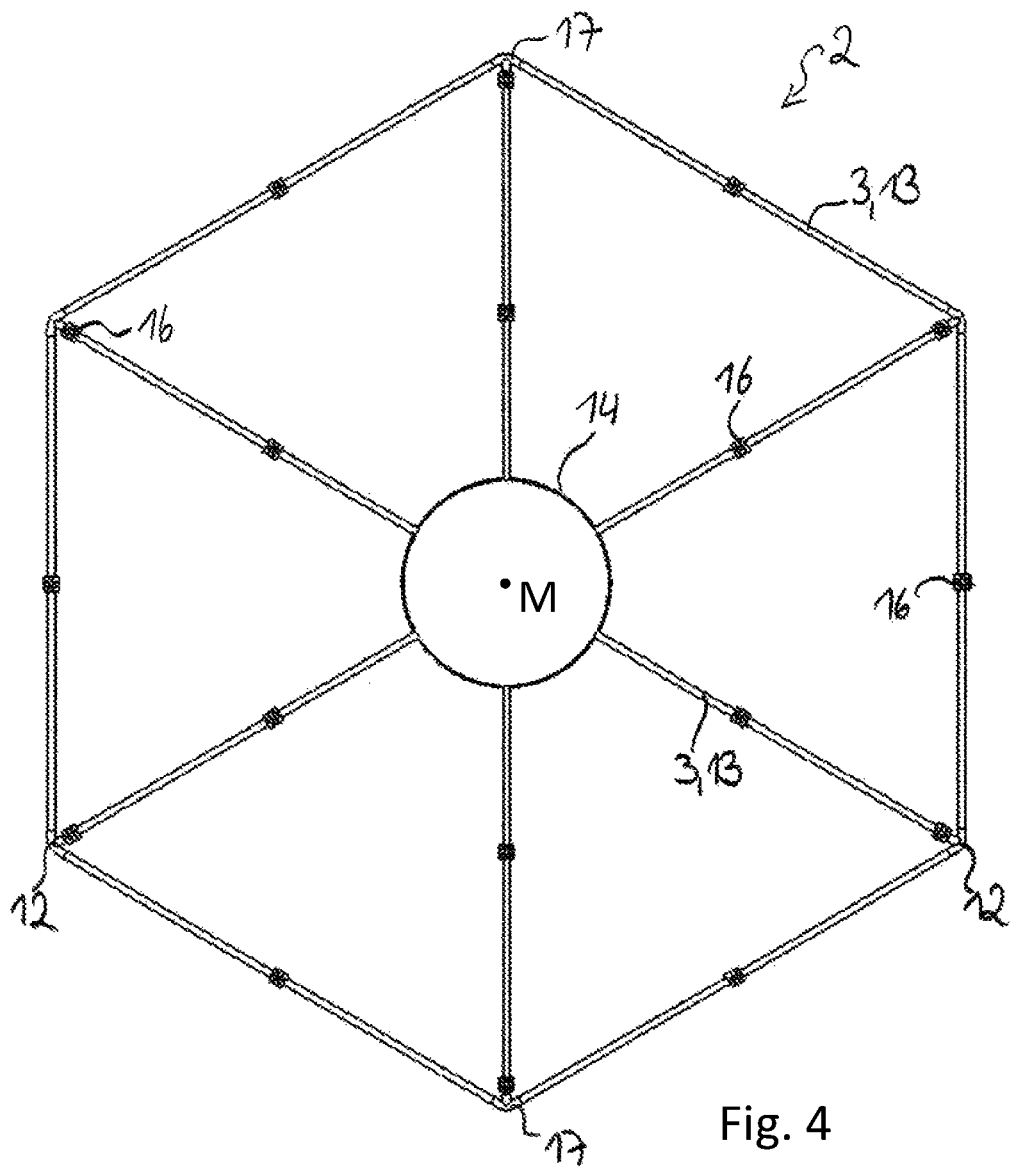
FIG. 4 Schematic representation of the top view of the supporting framework structure of a flight module.
Figure 6:
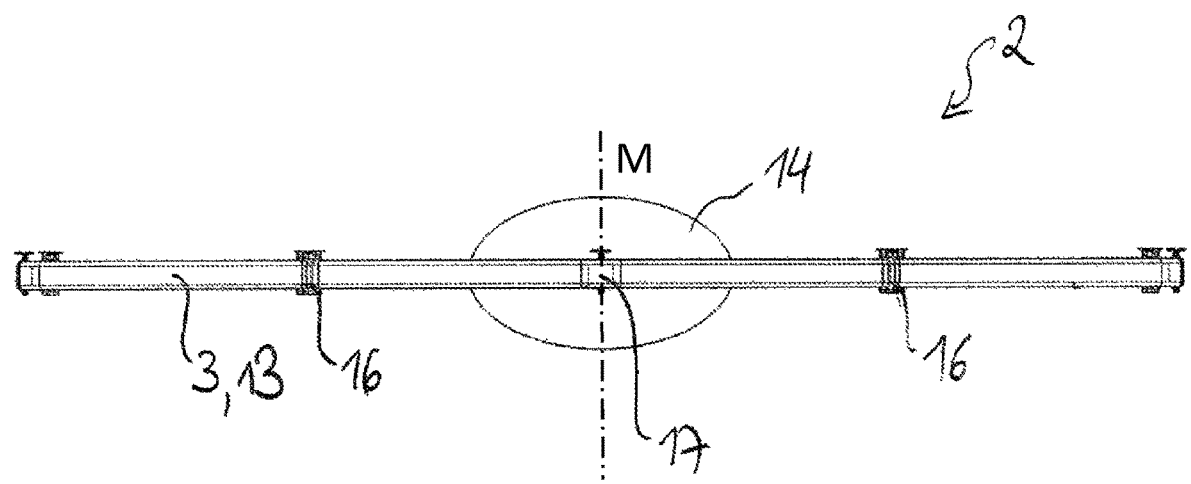
FIG. 6 Schematic representation of the side view of the supporting framework structure of a flight module with a central unit.

This supporting framework structure 3 and the central unit 14 of the flight module 2 according to FIGS. 1 and 2 are shown schematically from a top view in FIG. 4 and a side view in FIG. 6. The supporting framework structure 2 is formed by six framework struts 5 extending radially outwards from the central unit 8 and by six further framework struts which join together, at the node points 4, the ends of the radially extending framework struts 5 opposite to the central unit 8, forming a hexagon.

The connection of the framework struts 13 at the node points 12 is realized by means of T-joint shaped connecting pieces 17, which completely enclose the ends of the framework struts 13 to a depth of not less than 100 mm. The flush fit of the framework struts 5 in the connecting pieces 11 improves the alignability of the framework struts 5. In addition, the bearing forces are distributed more evenly. For purposes of creating the hexagonal form of the supporting framework structure 3, the connecting pieces 17 have three connector brackets, whereby two connector brackets enclose an angle of 60° in relation to each other.

The connectors 17 of the example embodiments are made of a fiber composite material and are designed in two parts, consisting of a top and a bottom shell, to simplify installation and maintenance.

The framework struts 5 to be connected with each other may also be positively connected to each other within the T-joint shaped connectors. For this purpose the ends of the framework struts 5 can have slots and tabs by means of which the framework struts 5 can be slotted together at a defined angle to each other.

The slotted-together ends of the framework struts 5 can be placed into the upper or lower shell of the two-part T-piece-shaped connecting piece 11, and after closing the T-piece-shaped connecting piece 11 can be completely enclosed by the T-piece-shaped connecting piece 11.

Furthermore, FIG. 4 shows brackets as a fastening means 16, which serve to fasten drive units 4 to the struts 13 of the supporting framework structure 3. The fastening means 16 are located both approximately centrally on each framework strut 13 and at the outer end of the framework struts 13 extending radially outwards from the central unit 14, however outside of the node points 12. In the example embodiment, a total of 18 fastening means 16 are provided for attaching 18 drive units 4, whereby however a different number of fastening means 16 and/or drive units 4 may be provided for.

Figure 9A:
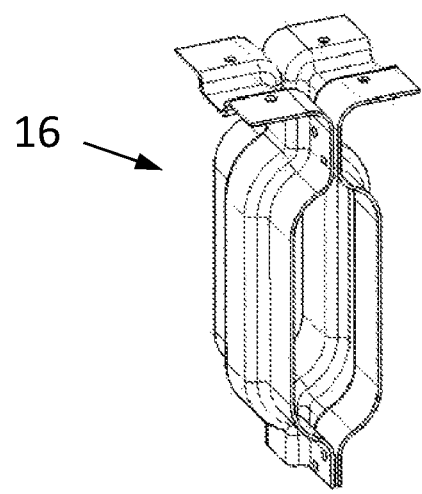
FIG. 9a-c Schematic representation of various clamps for fastening the drive units to the supporting framework structure.
Figure 9B:
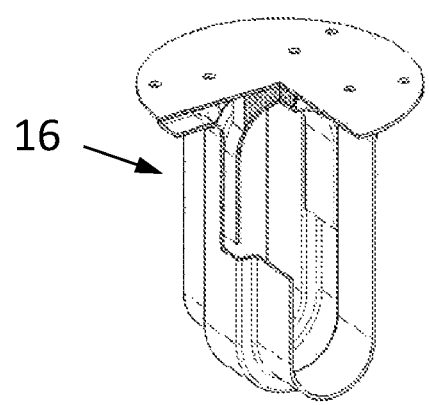
Figure 9C:
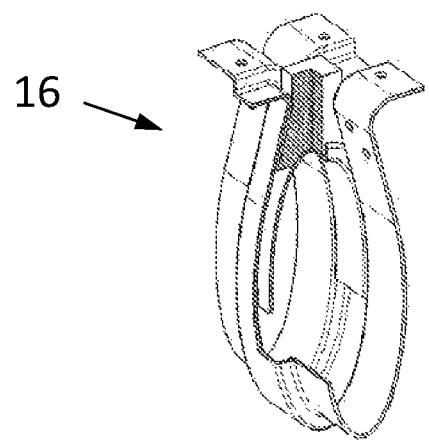

The fastening means 16 can for example be designed as shown in FIGS. 9a to 9c.

FIG. 9a shows a two-part bracket 16 comprising two half-shell-shaped bracket parts, each with ends angled to one side, which are clamped to the framework strut 13 (not shown) by means of a bolted connection in the horizontal direction.

The angled ends provide an area for joining the bracket parts to the drive unit 4 (not shown), where the bracket parts can be joined to the drive unit 4 by a bolted or riveted connection.

FIG. 9b shows a bracket as a fastening means 16, which has an omega-shaped lower bracket part with angled ends on both sides, a U-shaped upper bracket part and a flat cover element.

The omega-shaped lower bracket part encloses the framework strut at least partially at the sides and in the lower area. The U-shaped lower bracket part encloses the framework strut at least partially at the sides and in the upper area.

The cover element of the bracket is joined via a bolted or riveted connection to the angled ends of the omega-shaped bracket part, as a result of which the bracket is clamped in the vertical direction to the framework strut 13. Furthermore, the cover element serves to attach the drive unit 4 (not shown).

In addition, a compression piece (intermediate layer element) is provided, which supports the U-shaped upper bracket part against the cover element, as a result of which, when the bracket is closed, the omega-shaped lower bracket part and the U-shaped upper bracket part are pressed both against each other and against the framework strut 13, thus creating the force-fitting and form-fitting connection between the bracket and the framework strut 13. The compression piece can also be an integral part of the cover element or of the U-shaped bracket part.

The bracket according to FIG. 9b therefore consists of four parts.

FIG. 9c shows a bracket as a fastening means 16, which has an omega-shaped lower bracket part with angled ends on both sides, a U-shaped upper bracket part and a compression piece (intermediate layer element).

The omega-shaped lower bracket part encloses the framework strut 13 at least partially at the sides and in the lower area, with the angled ends of the omega-shaped lower bracket part providing an area for connecting to the drive units 4.

The U-shaped lower bracket part encloses the framework strut 13 at least partially at the sides and in the upper area.

The angled ends of the omega-shaped bracket part can be attached by means of a bolted or riveted connection to the drive unit 4 (not shown), as a result of which the bracket is clamped in the vertical direction to the framework strut 13.

The additionally provided compression piece (intermediate layer element) supports the angled ends of the omega-shaped bracket part above the framework strut 13 and, when the bracket is closed and the drive unit 4 is fitted, it causes the omega-shaped lower bracket part and the U-shaped upper bracket part to be clamped against the framework strut 13, thus creating the force-fitting and form-fitting connection between the bracket and the framework strut 13. The compression piece can be part of the U-shaped bracket part.

The bracket according to FIG. 9c therefore consists of three parts.

In the upper area, the fastening means 16 according to FIGS. 9a to 9c each have angled ends for direct attachment of the drive units 3 (FIGS. 9a, 9c), or for indirect attachment of the drive units 4 (FIG. 9b) via the cover element.

The drive units 4 can be bolted or riveted to the angled ends or to the cover element.

The fastening means 16 according to FIGS. 9a to 9c each form an omega shape when assembled, i.e. their outer shape approximately corresponds to the Greek capital letter omega. In addition, the fastening means 16 are designed in such a way that they follow the outer contour of the framework struts 13 as far as possible and at least partially surround the framework strut at the sides and at the bottom, so that a force-fitting and form-fitting connection with the framework strut 13 is ensured in the connected state.

The framework struts 13 consist of a pultruded hollow profile made from fiber-reinforced plastic, e.g., carbon-fiber reinforced plastic.

Figure 8A:
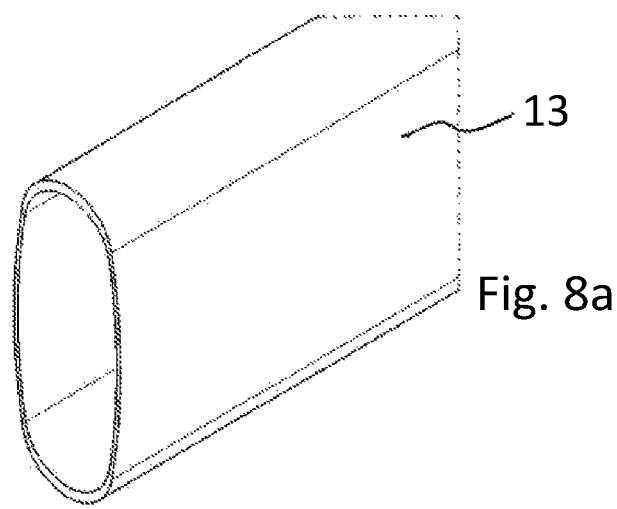
FIG. 8a-c Schematic representation of various cross-sections of the framework struts.
Figure 8B:
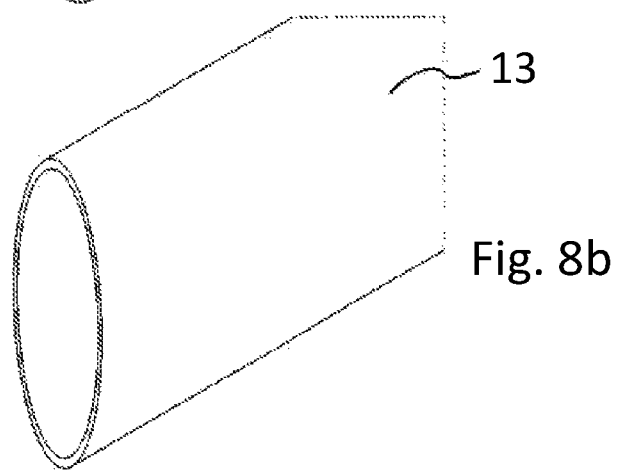
Figure 8C:
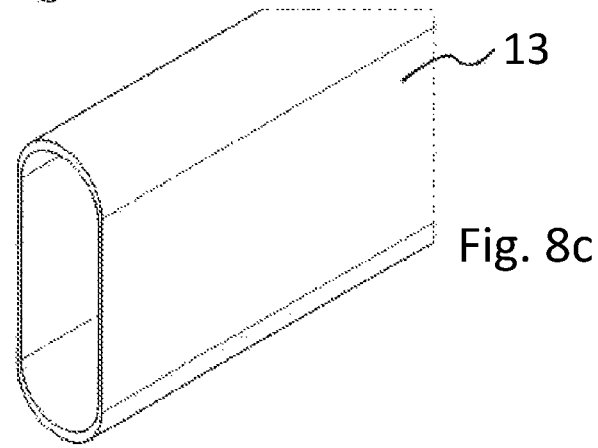

FIGS. 8a to 8c show three hollow profiles in sectional view, of which the hollow profile according to FIG. 8a has a preferably oval cross-section, the hollow profile according to FIG. 8b has an elliptical cross-section, and the hollow profile according to FIG. 8c has an oblong cross-section. The longitudinal sides of the hollow profiles each point in a vertical effective direction of the drive units 4 (not shown).

The hollow profile of the framework struts 13 according to FIGS. 8a, 8b and 8c in each case has a variable wall thickness in the circumferential direction of the framework strut 13.

The wall thickness is greater in areas of the circumference with high stress due to forces acting on it than in areas of lower stress. For example, as can be seen in FIGS. 8a, 8b, 8c the wall thickness can be greater in the area of the small sides of the circumference (top and bottom in the depiction according to FIGS. 8a, 8b, 8c) than in the area of the longitudinal sides of the circumference. Furthermore, the wall thickness can vary not only in the circumferential direction along the cross-section, but also along the longitudinal extension of the framework strut 13. For example, the wall thickness of the framework struts 13 extending radially outwards from the central unit 14 can increase from the outside to the inside in the direction of the central unit 14. The occurring loads can be computer-simulated to calculate the required minimum wall thickness.

Cables for signal connections and the power supply run through the hollow profile.

Referring again to FIG. 3, it can be seen that the flight module 2 has drive units 4 that each have a propeller 6 with a rotor consisting of two rotor blades and a brushless DC motor as electric motor 5, with the propeller 6 being driven by the electric motor 5. By means of a hub of the respective propeller 6, the propeller is rotatably mounted on the electric motor 5.

Optionally a cover, e.g. in the form of a spinner, can be present to seal the drive unit 4 against water and dirt and to improve the aerodynamics. The propellers 6, in particular its rotors, have a fiber-reinforced composite material, e.g. carbon-fiber-reinforced plastic.

Figure 3:
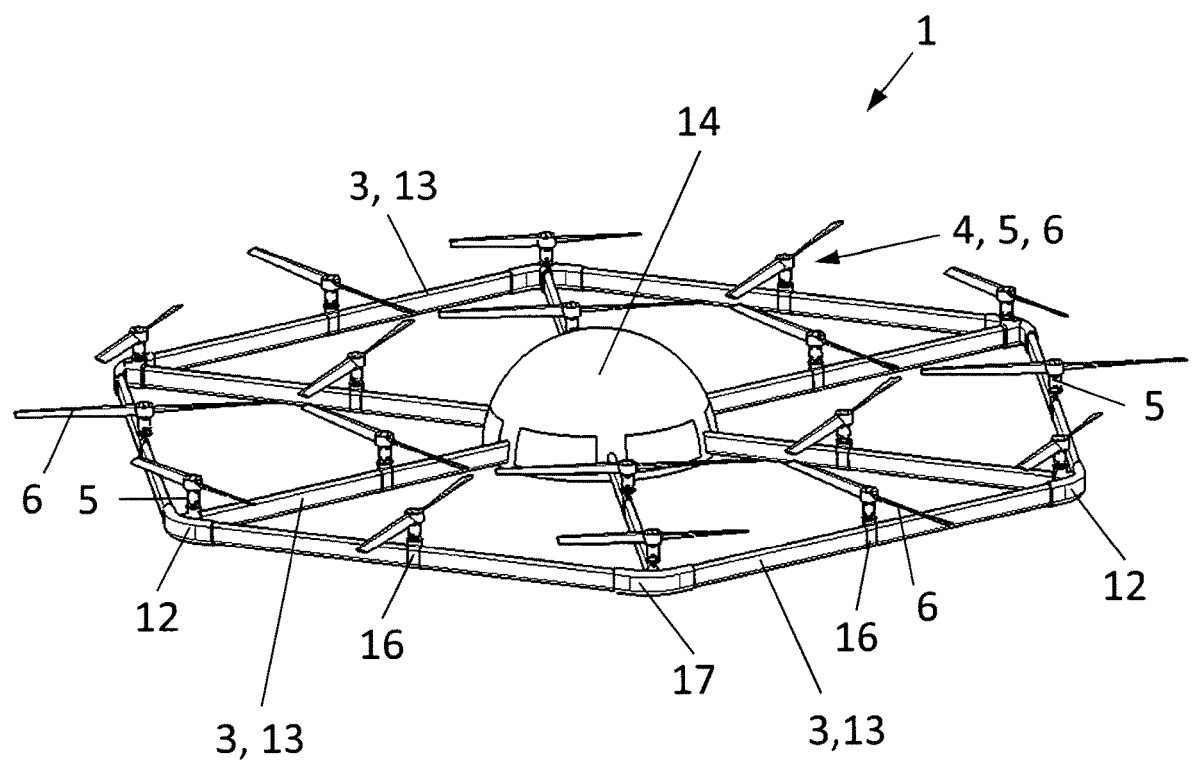
FIG. 3 Example depiction of a flight module with a central unit.
Figure 5:
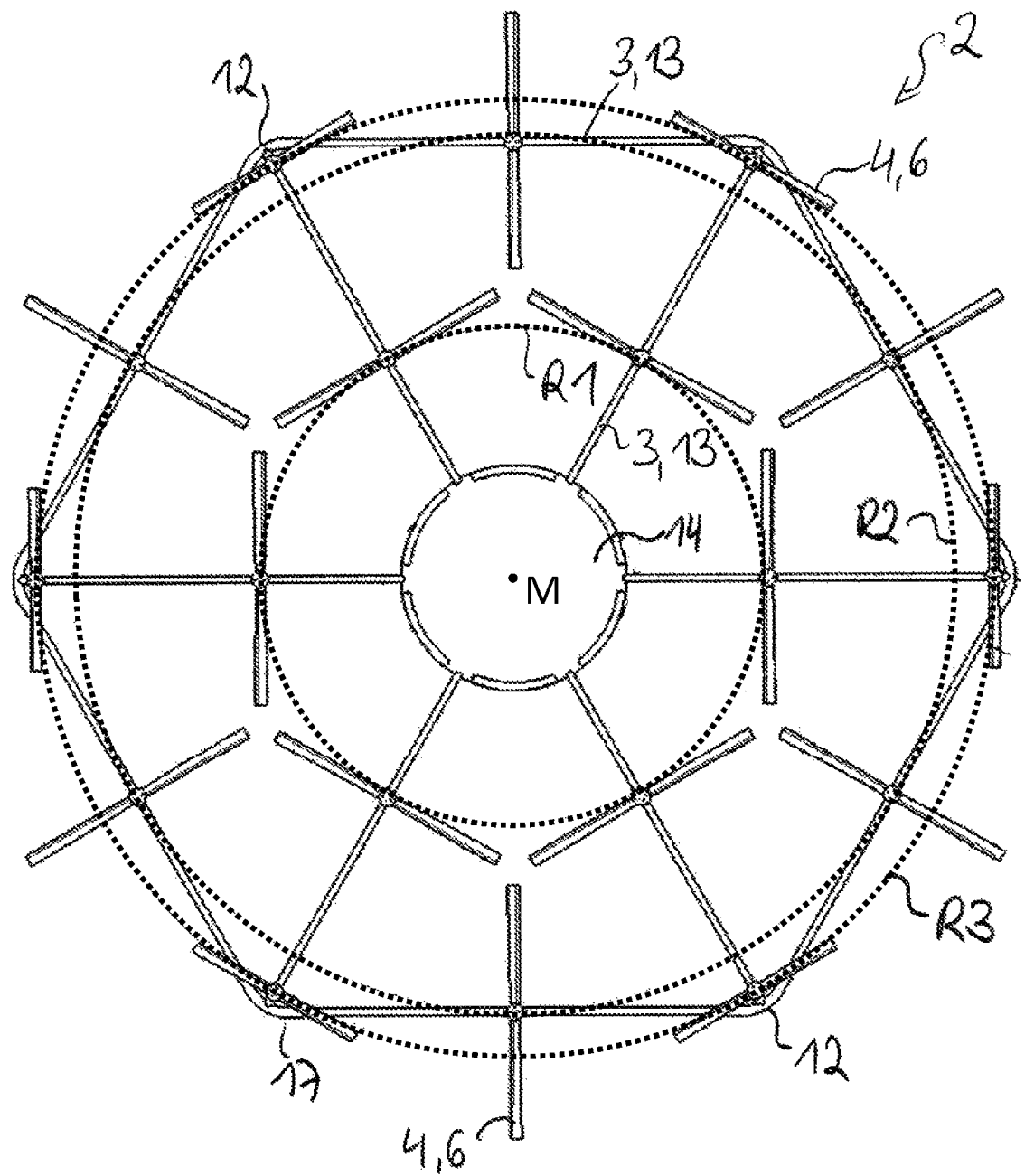
FIG. 5 Schematic representation of the top view of a flight module with supporting framework structure and drive units and central unit arranged thereon.

FIG. 5 shows a schematic plan view of the flight module 2 according to FIG. 3.

The drive units 4, in the example embodiment 18 drive units 4, are arranged in a plane of the supporting framework structure 3 outside the node points 12 in a first, a second and a third ring (R1, R2, R3) each with six drive units 4 concentrically arranged around the vertical center axis M of the flight module 2. The first, second and third ring R1, R2, R3 have a different ring diameter DR1, DR2, DR3 (also shown in FIG. 7).

The drive units 4 are attached directly to the framework struts 13 of the supporting framework structure 3 by means of the fastening means 16 designed as brackets.

Figure 7:
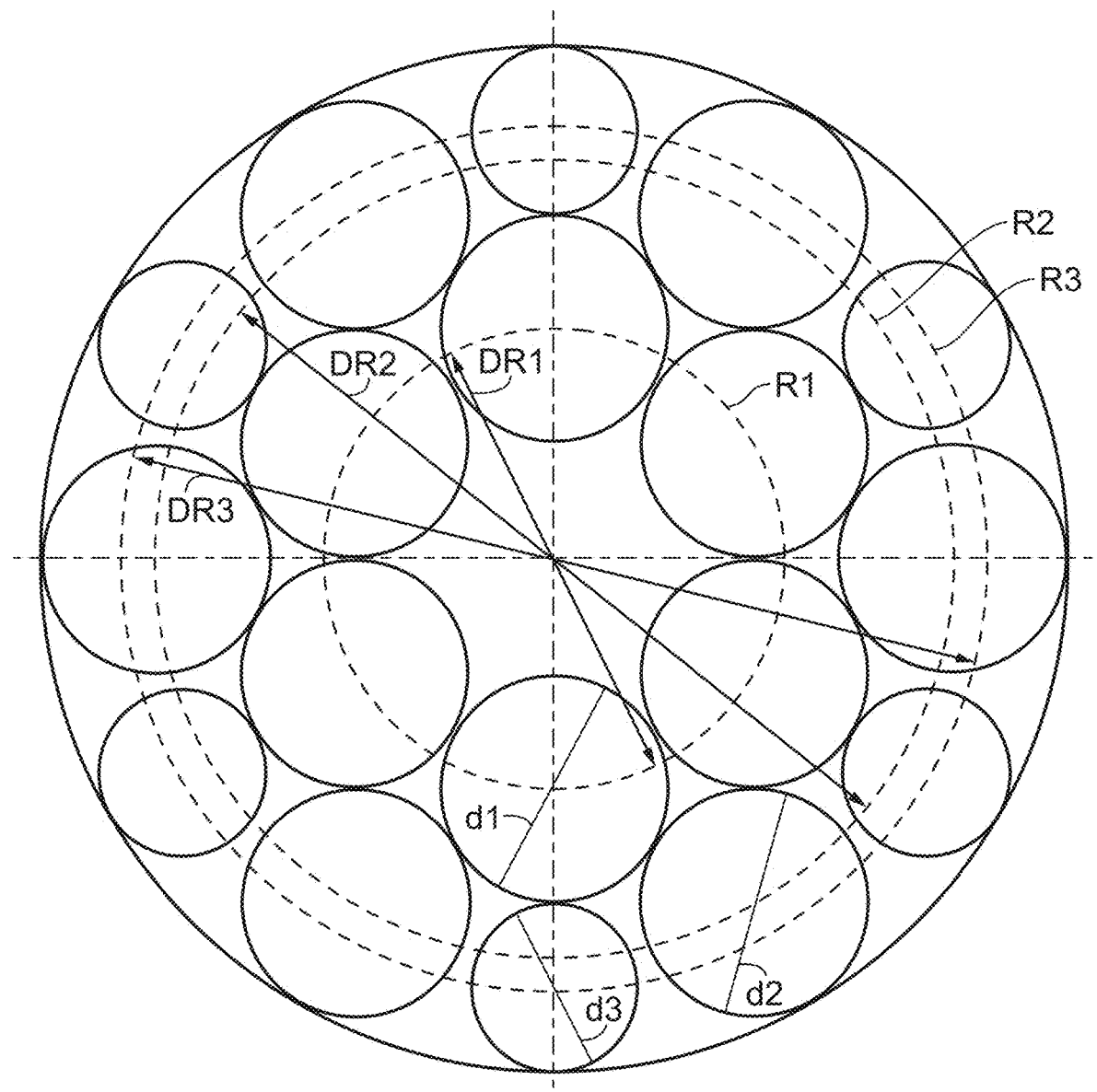
FIG. 7 Schematic representation of the airspace covered by the drive unit propellers of a flight module.

The rotors of the propellers 6 of the drive units 4 have different diameters d1, d2, d3. In the example embodiment, the rotors of the six propellers 7 of the drive units 3 of the first (inner) ring R1 have a first uniform diameter d1 of 1800 mm. The rotors of the six propellers 6 of the drive units 4 of the second ring R2 have a second diameter d2, which in the example embodiment is equal to the diameter d1 of the rotors of the propellers 6 of the inner first ring of 1800 mm. The rotors of the six propellers 6 of the drive units 4 of the third ring R3 have a third diameter d3 of 1300 mm (FIG. 7). In other words, the flight module 2 has twelve propellers 6 with rotors with a diameter d1, d2 of 1800 mm and six propellers 6 with rotors with a diameter d3 of 1300 mm.

According to this example embodiment, the arrangement of the drive units 4 around the vertical center axis M and the size of the propeller 6 rotors results in an overall maximum diameter of the flight module 2 of 8.14 m.

FIG. 7 shows the airspace coverage achievable by the rotors of the propellers 6 of the drive units 4 of the flight module 2. It can be seen that the described selection of the rotors of the propellers 6 achieves a high concentration of the coverable area above the supporting framework structure 3 and hence very good airspace coverage, even though only two rotor types would need to be manufactured.

The very good airspace coverage improves the performance of the flight module 2, and thus of the aircraft 1 as well, and at the same time minimises the space requirements of the flight module 1 for take-off and landing, which is advantageous particularly when operating the aircraft 1 in an urban environment.

The central unit 14 of the flight module 2 is designed in the form of a hemisphere made of carbon-fiber-reinforced or glass-fiber-reinforced plastic. The communication and control technology of the flight module 2 is located in the central unit 14. In addition, the central unit 14 contains rechargeable batteries for supplying energy to the drive units 4 and other electrical consumers.

Optionally, the central unit 14 can also accommodate a rescue system with a parachute for shooting out.

The transport module 7 for the aircraft 1 is described in more detail below with reference to FIGS. 10 to 12.

Figure 10:
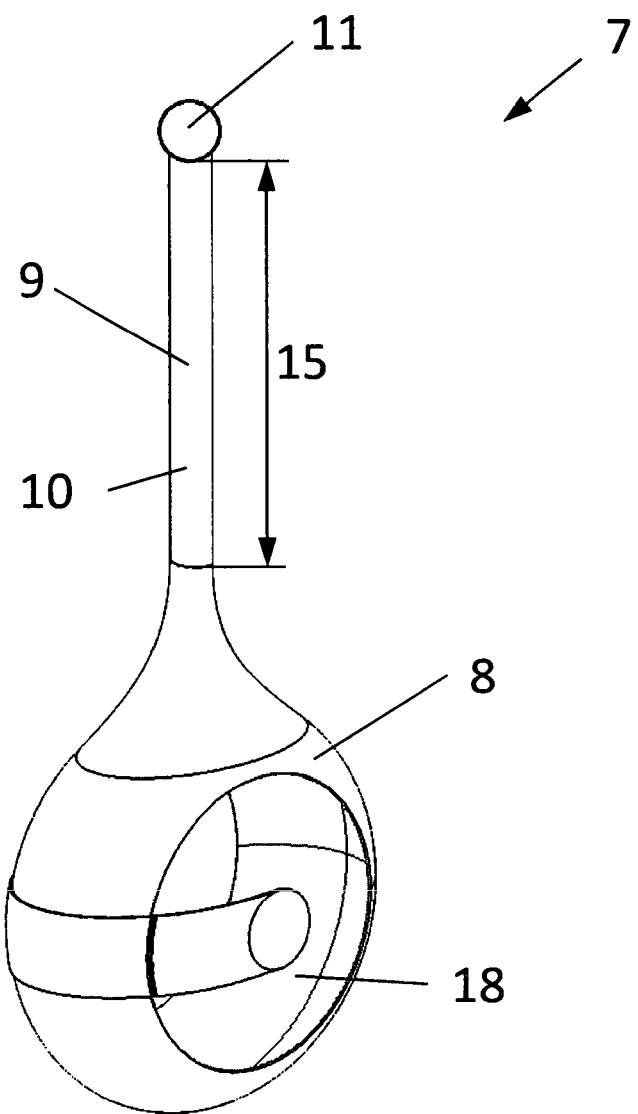
FIG. 10 Example depiction of a transport module with a coupling device.

FIG. 10 shows an example depiction of the transport module 7 for transporting people. The transport module 7 has a drop-shaped conveying pod 8, whereby the drop-shape is essentially vertically aligned when the aircraft (see FIG. 1) is in flight. The width of the drop-shape is reduced, as is likewise shown in FIGS. 1 and 10 and especially in FIG. 12.

The conveying pod 8 has two opposite doors 18 through which the people to be transported can enter and exit the conveying pod 8. The door panels of doors 18 are round in the example embodiment, but can have any other shape.

The doors 8 may be connected to the conveying pod 8 by means of a movable connection device (schematic diagram showing a bracket attached to the doors). The doors can be opened or closed by means of a hinge system or moved by means of a rail system that can be arranged to be slid on the conveying pod.

The conveying pod 8 is designed to be completely enclosed and has a partially transparent cover so that people can look out of the conveying pod 8.

Optionally, the conveying pod 8 can be equipped with a charging module with one or more rechargeable energy storage devices.

The interior of the conveying pod 8 is equipped with seats equipped with safety belts and airbags, an air conditioning system, displays and a communication system for communication with the flight module 2, other aircraft or a ground station (not shown).

The conveying pod 8 can be connected to a flight module 2 by means of a connecting device 9. The connection device 9 has a longitudinally extended, rotationally symmetrical shaft 10 that connects at one end to the conveying pod 8.

The shaft 10 is designed to extend so that a safety height clearance 15 is created.

The safety height clearance 15 is determined by the length of the shaft 10. The safety height clearance 15 and/or the shaft 10 measures, for example, 3 m above a staging area for the conveying pod 8 when measured together with the height of the conveying pod 8, whereby the conveying pod 8, for example, has a height of 2 m and the safety height clearance 15 and/or the length of the shaft 10 is 1.0 m.

The shaft 10 as well as the conveying pod 8 have a fiber-reinforced composite material, e.g. carbon fiber or glass fiber reinforced plastic, whereby the transport module 7 is characterised by low mass and very good mechanical properties.

Figure 11:
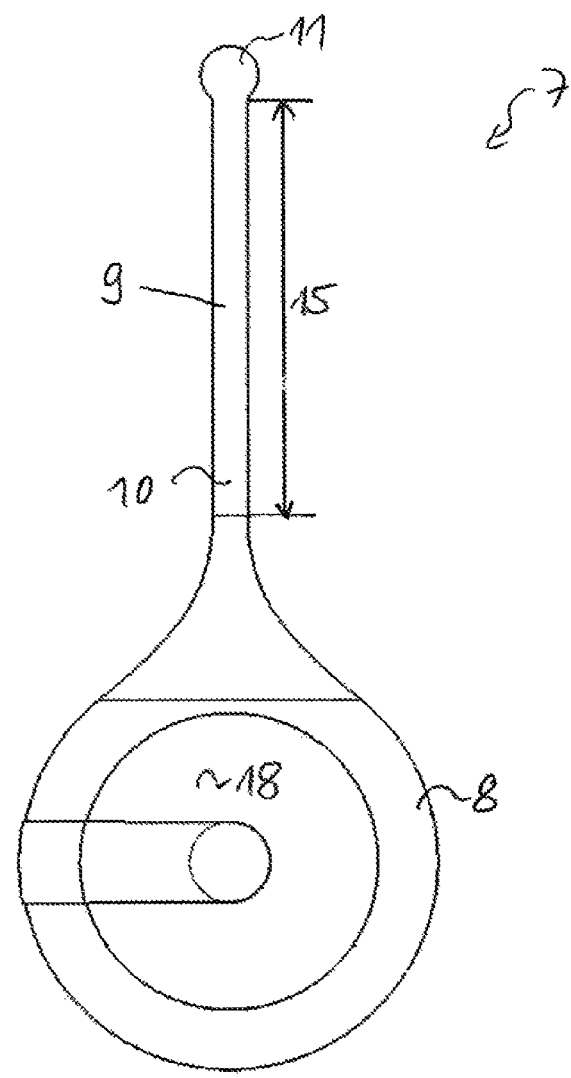
FIG. 11 Schematic representation of a side view of a transport module with a coupling device.

FIG. 11 shows the transport module 7 from FIG. 10 in a schematic depiction of the side view. In addition to the components described in connection with FIG. 10, FIG. 11 shows the safety height clearance 15 which is determined by the length of the shaft 10.

Figure 12:
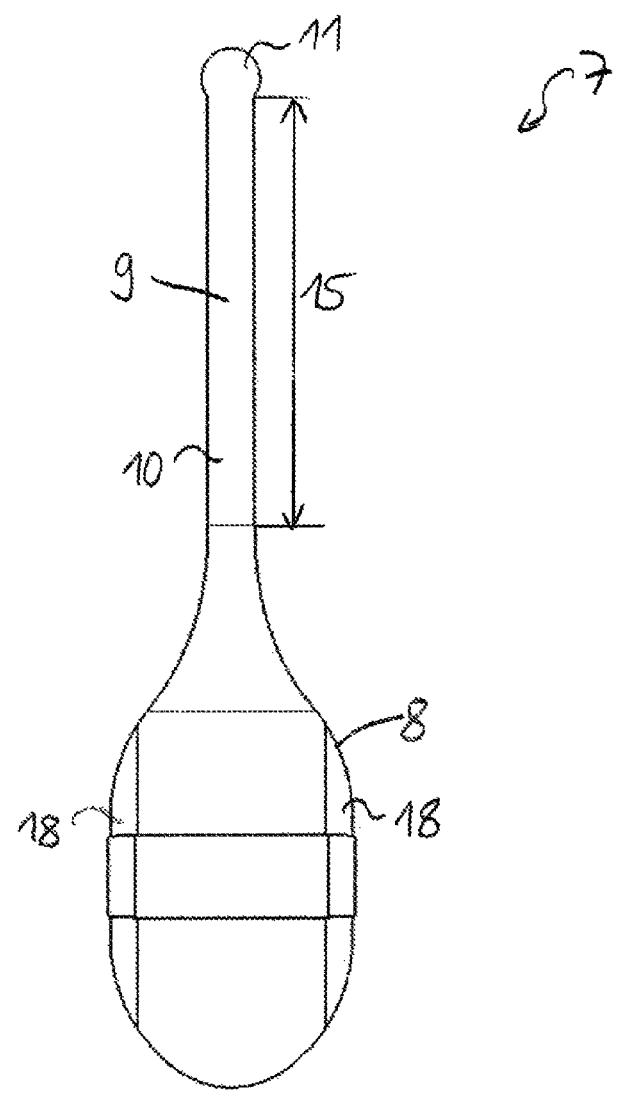
FIG. 12 Schematic representation of a side view of a transport module with a coupling device.

FIG. 12 shows the transport module 7 from FIG. 10 in another schematic side view from a perspective rotated by 90° around the longitudinal axis of the shaft 10 in relation to the depiction in FIG. 11.

FIGS. 1 and 2 show that the flight module 2 may be coupled with the transport module 7. It is apparent that the transport module is coupled with the underside of the central unit 14 located in the center of the flight module 2. Accordingly, the the transport module 7 is arranged centrally below the flight module 2.

In order to couple the two modules, the coupling device 11 which is designed as an automatic articulated coupling device 5 in the example embodiment, so that it is possible to automatically couple and uncouple different transport modules 7 to the same flight module 2, whereby the transport modules 7 may be of different designs. Similarly, different flight modules 2 may be coupled with the same transport module 7.

The design as an articulated coupling allows a flexible incline position for the transport module 7 and flight module 2 in relation to each other. In other words, by means of the articulated coupling, the inclination of the flight module 2 can be varied relative to the coupled transport module 7. In this way, a vertical alignment of the transport module 7 can be largely maintained during flight operation even if the orientation of the flight module 2 varies, and the aircraft's 1 center of gravity can be centered on a limited central area, which improves the comfort and the controllability of the aircraft 1.

The coupling device 11 may be designed to be controllable so that a connection between transport module 7 and flight module 2 can be established or released in a controlled manner.

The flight module 2 and the transport module 7 can communicate with each other using an on-board system. For example, the transport module 7 can provide a status report on the loading and/or boarding status or the position in a departure and landing station. Both flight module 2 and the transport module 7 can send a status message upon successful coupling. Furthermore, it is possible for the flight module 2 to provide information, e.g. regarding flight status, travel time, weather, etc. which may be communicated to the people in the transport module 7, e.g. using a display in the conveying pod 8.

Figure 13:
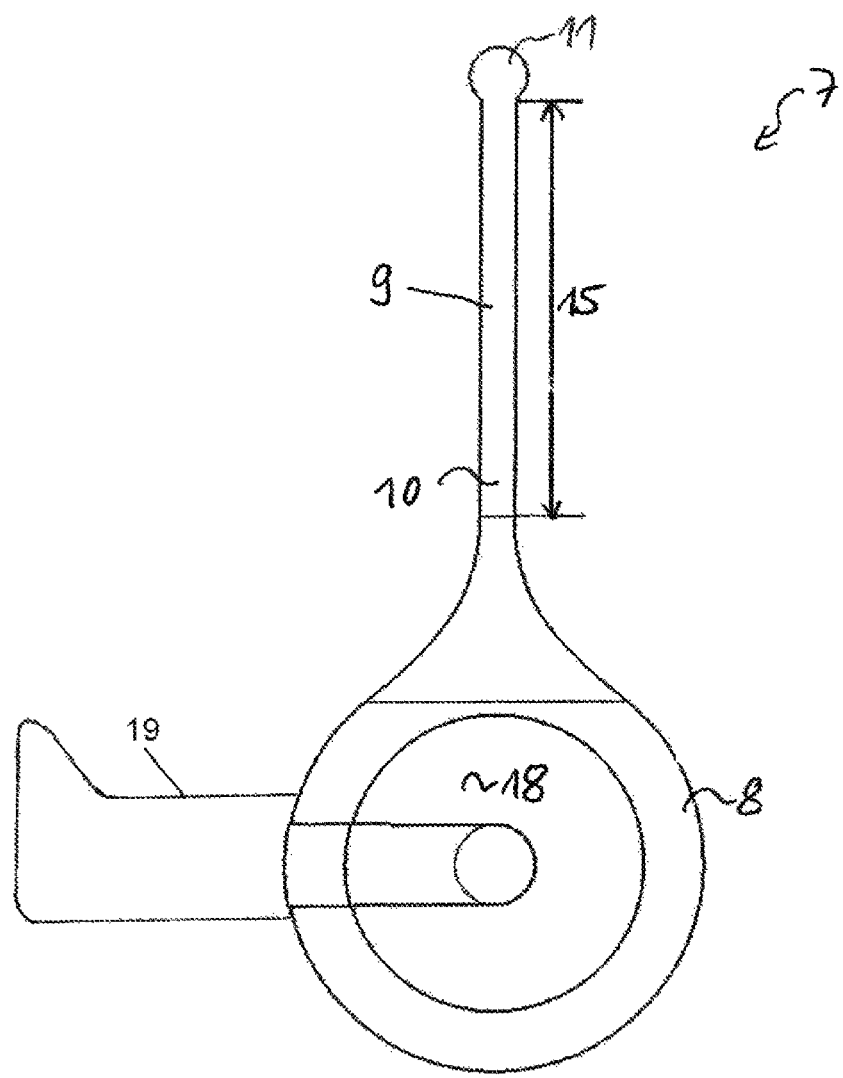
FIG. 13 Schematic representation of a transport module in side view with an air guiding device.

FIG. 13 shows a transport module 7 which has an air guiding device 19. It is designed as a wing-like, vertically oriented flat plat and mounted on one of the rear sides of the transport module 7 opposite the direction of flight, preferably that of the transport module 7 (FIG. 13: Flight direction of aircraft 1 is the focal plane; the aircraft 1 is moving to the right). The air guiding device 19 functions as a stabilizer which holds transport module 7 in a stable position relative to its vertical or longitudinal axis during the flight of aircraft 1.

The air guiding device 19 can be stationarily or rotatably attached to the transport module 7. Furthermore, the position of the air guiding device 19 may be movable in relation to the transport module 7, e.g., linearly extended or retracted.

Additional air guidance devices 19 may be fitted to provide further stabilising effects or improvements in airflow on the transport module 7.

Figure 14:
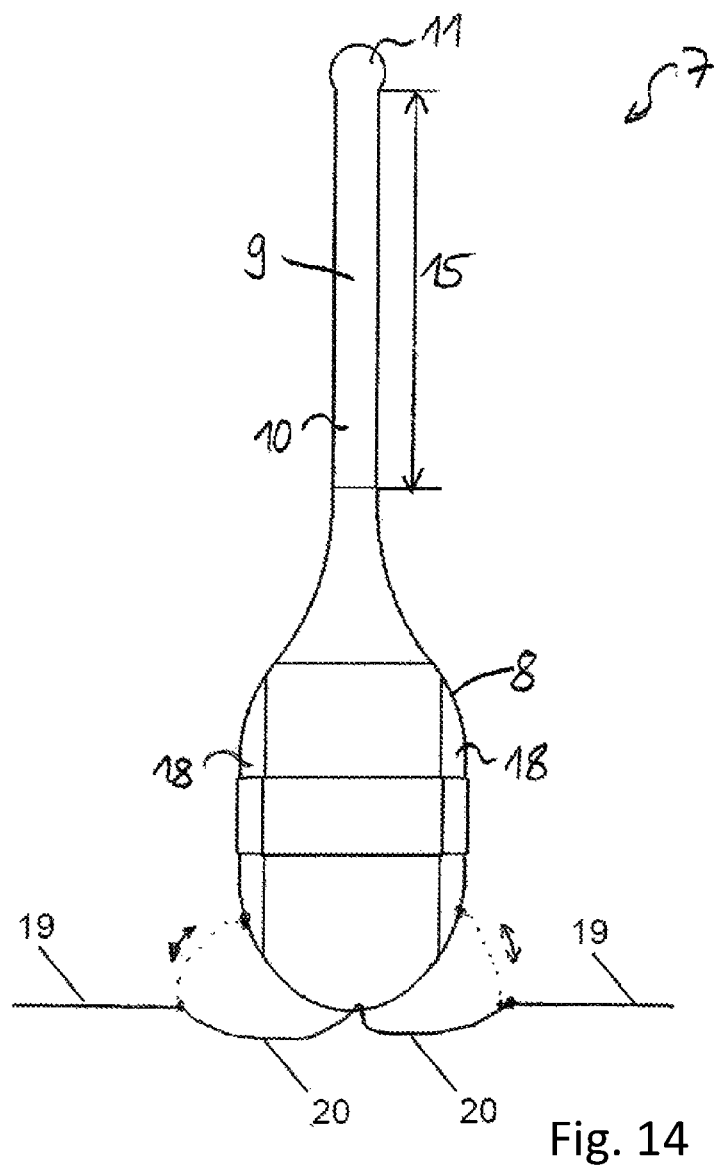
FIG. 14 Schematic representation of a transport module in an additional side view with an air additional guiding device.

FIG. 14 shows a transport module 7 with two additional air guiding devices 19 which serve as aids for generating additional lift for aircraft 1 during cruising flight (forward flight) of aircraft 1.

The air guiding devices 19 each have a wing that is flat or slightly curved, whereby the wing plane is extended in the direction of flight of aircraft 1, in particular in the direction of flight of the transport module 7 (FIG. 14: the direction of flight of aircraft 1 is perpendicular to the image level), so that the cross-section of the flat wing is only visible as a line in FIG. 14.

The air guiding devices 19 can be attached in the lower area of the conveying pod 8 with the aid of two mounting brackets 20, whereby the mounting brackets 20 on the conveying pod 8 and the air guiding devices 19 may each be rotatably mounted to a mounting bracket 20. The mounting brackets 20 can follow the shape of the lower part of the conveying pod 8. This allows the air guiding devices 19 to be folded tightly on the conveying pod and, if needed, may be folded far out from it (FIG. 14: dotted line with double arrow).

During aircraft take-off and landing, the wings 19 can be folded on to the conveying pod 8 in order to avoid any negative effect on air flow. During aircraft 1 cruising (forward flight) with a connected transport module 7, the wings 19 can be folded out and, due to their aerodynamic lift, help carry the transport module 7 so that the flight module 2 performs less load-bearing work and can generate more power for forward flight.

Preferably, the wings 19 are located in the lower area of the transport module 7, because here influence by the downflow of the propellers 6 of the flight module 2 is lowest.

Figure 15:
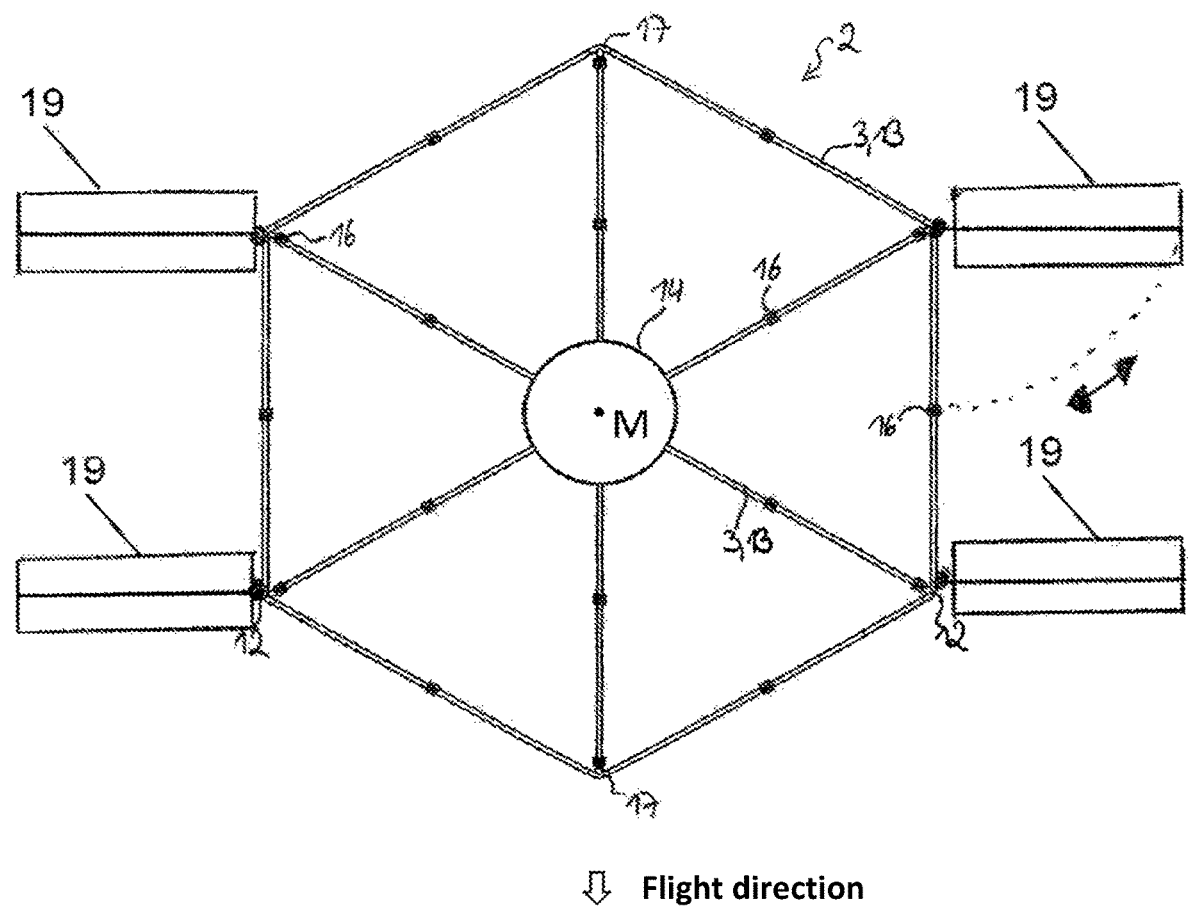
FIG. 15 Schematic representation of the top view of the supporting framework structure of a flight module with an air guiding device.

FIG. 15 shows a flight module 2 with four air guiding devices 19, which also act as a means of lift. The air guiding devices 19 have flat wings 19. They may be attached to the framework struts 13 on the flight module 2 or on the connecting pieces to the connection between the framework struts 13 and the framework support structure 3. They can be designed to be rotatably mounted so that the air guiding devices 19 can be folded up against the supporting framework structure 3 and unfolded from it (dotted line with double arrow).

The air guiding devices 19 each have a flat wing 19, which for example is mounted so as to likewise be rotatable about its longitudinal axis.

When flying forward at an appropriate high speed in the direction indicated, the wings are folded out and assist the propellers 6 of the drive units 4 (not shown here) to generate additional lift for the aircraft 1.

In addition, the wings can be rotated around their longitudinal axis to change the angle of incidence relative to the airflow and thus adjust the lift.

Preferably the wings are located in the upper or lateral region of the supporting framework structure 3 of the flight module 2 on the framework struts 13, because here the influence of the downflow from the propellers 6 is lowest.

According to FIGS. 13 to 15, the air guiding devices 19 can be designed to be controllably adjustable in their orientation to the conveying pod 8, or rather to the supporting framework structure 3 of the flight module 2, so that their function can be optimally adapted to the flow conditions etc. during flight operation.

Figure 16:
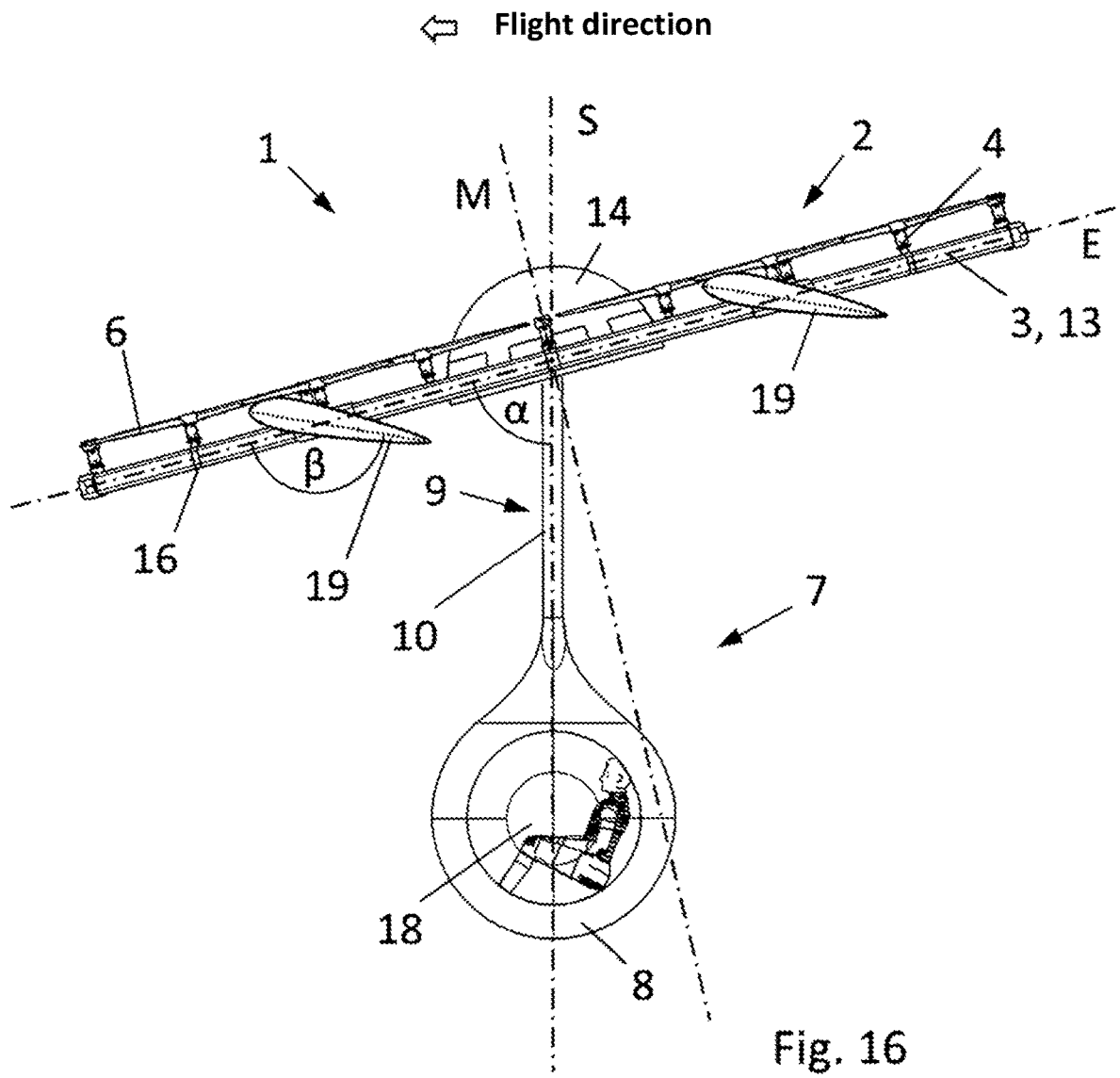
FIG. 16 Schematic representation of an aircraft with inclined flight module and angled air guiding devices.

FIG. 16 shows an aircraft 1 in a side view with a flight module 2 angled downward in the direction of flight with tilt angle $\alpha$ of approximately 75°. The tilt angle $\alpha$ is enclosed by the plane E of the supporting framework structure 3 and the vertical line of gravity S, which corresponds to the longitudinal axis of shaft 10 as depicted in FIG. 16. The position of the center axis of flight module 2 deviates from the vertical line of gravity S.

Such a tilt angle $\alpha$ can be set, for example, during the acceleration of the aircraft 1, whereby a comfortable, vertical alignment of the conveying pod 8 of the transport module 7 maintained.

FIG. 16 also shows two of the four air guiding devices 19 of flight module 2, which are arranged on the supporting framework structure of flight module 2 as shown in the plan view in FIG. 15. The air guiding devices 19 are set at an angle of incidence ß of approximately 150° with respect to the plane E of the supporting framework structure 3. The angle of incidence ß is enclosed by the plane E of the supporting framework structure 3 and the central cross-sectional plane of the air guiding device 19.

In a braking situation (not shown), the tilt of the flight module 2 with respect to the line of gravity S and the set position of the air guiding devices 19 can be reversed, so that, for example, a tilt angle $\alpha$ of 105° and an angle of incidence ß of approximately 235° can result.

With regard to the other elements of aircraft 1 of FIG. 16, reference is made to the previous explanations.

The term "and/or" used here, when used in a series of two or more elements, means that any of the listed elements may be used alone, or any combination of two or more of the listed elements may be used.

For example, if a relationship is described that contains the components A, B and/or C, the relationship can contain the component A alone; B alone; C alone; A and B in combination; A and C in combination; B and C in combination; or A, B and C in combination.

LIST OF REFERENCE NUMERALS

1 Aircraft
2 Flight module
3 Supporting framework structure
4 Drive unit
5 Electric motor
6 Propeller
7 Transport module
8 Conveying pod
9 Connecting device
10 Shaft
11 Coupling device
12 Node point
13 Framework struts
14 Central unit
15 Safety height clearance
16 Fastening means
17 Connecting piece
18 Door
19 Air guiding device
10 Mounting bracket
R1, R2, R3 First, second, third ring
d1, d2, d3 Diameter of the rotor
DR1, DR2, DR3 Diameter of the ring
M Center axis of the flight module
E Plane of the supporting framework structure
S Line of gravity
α Tilt angle
ß Angle of incidence

What is claimed is:

1. A vertical take-off and landing modular aircraft for transporting people and/or loads, wherein the aircraft comprises:
    a flight module comprising a plurality of drive units arranged on a supporting framework structure, each drive unit comprising an electric motor and one propeller operatively connected to the electric motor;
    a transport module comprising a conveying pod and a connecting device for connecting the conveying pod with the flight module, the connecting device comprising a longitudinally extended shaft, one end of which connects to the conveying pod; and
    a coupling device, configured for coupling and decoupling the flight module, wherein for reversibly connecting the flight module to another end of the longitudinally extended shaft of the transport module a first part of the coupling device is arranged on the flight module and a second part of the coupling device is arranged as a counterpart on the other end of the longitudinal shaft of the transport module.

2. The aircraft of claim 1, wherein the flight module and/or the transport module comprises one or more air guiding devices.

3. The aircraft of claim 2, wherein an angle of incidence ß of the one or more air guiding devices is variable.

4. The aircraft of claim 1, wherein the flight module comprises a central unit.

5. The aircraft of claim 1, wherein the flight module and/or the transport module further comprises a charging module.

6. The aircraft of claim 1, wherein the supporting framework structure of the flight module comprises framework struts connected to each other at node points and wherein a number of drive units are arranged outside of the node points.

7. The aircraft of claim 1, wherein a number of drive units of the flight module are arranged concentrically around a center axis of the flight module.

8. The aircraft of claim 1, wherein rotors of the propellers of some number of the drive units have different diameters.

9. The aircraft of claim 1, wherein the supporting framework structure of the flight module comprises framework struts, all or some of which have a hollow profile with an oval profile cross-section.

10. The aircraft of claim 1, wherein the shaft of the connecting device is designed in an elongated fashion to create a safety height clearance of the coupling device above the conveying pod.

11. The aircraft of claim 1, wherein the shaft of the connecting device is substantially rotationally symmetrical and/or wherein the conveying pod of the transport module is rotationally symmetrical and/or substantially drop-shaped.

12. The aircraft of claim 1, wherein the coupling device is designed as an articulated coupling device.

13. The aircraft of claim 1, wherein a tilt angle α of the flight module is variable.

14. The aircraft of claim 1, wherein the supporting framework structure and/or the central unit and/or a number of the drive units comprises components which are made of fiber-reinforced composite or consist of fiber-reinforced composite and/or wherein the shaft and/or the conveying pod include fiber composite material or are made of fiber composite material.

15. The aircraft of claim 1, wherein the transport module comprises fiber composite material or is made of fiber composite material.

16. The aircraft of claim 14, wherein the fiber composite material comprises textile reinforcing elements and/or unidirectionally arranged reinforcing fibers.

17. The aircraft of claim 1, wherein the aircraft further comprises a control unit which is arranged and designed to output a control signal to switch the drive units on or off and/or to open or close the coupling device and/or to set a tilt angle α of the flight module and/or to set an angle of incidence ß of one or more air guiding devices comprised in the aircraft.

18. The aircraft of claim 1, wherein, in a coupled state, the transport module is arranged below the flight module.

19. The aircraft of claim 1, wherein the coupling device is designed as an automatic coupling device.

20. A combination for transporting people and/or loads with a vertical take-off and landing modular aircraft, wherein the combination comprises:
    a first flight module comprising a plurality of drive units arranged on a supporting framework structure, each drive unit comprising an electric motor and one propeller operatively connected to the electric motor;
    a first transport module comprising a conveying pod and a connecting device for connecting the conveying pod with the first flight module, the connecting device comprising a longitudinally extended shaft, one end of which connects to the conveying pod;

a second flight module which is different from the first flight module and comprises a plurality of drive units arranged on a supporting framework structure, each drive unit comprising an electric motor and one propeller operatively connected to the electric motor;

a second transport module which is different from the first transport module and comprises a second conveying pod and a second connecting device for connecting the second conveying pod with the second flight module, the second connecting device comprising a longitudinally extended shaft, one end of which connects to the second conveying pod; and a coupling device configured for coupling and decoupling the first flight module or the second flight module to another end of the longitudinally extended shaft of the first transport module or the second transport module.

* * * * *